United States Patent [19]

Wright et al.

[11] Patent Number: 4,775,400
[45] Date of Patent: Oct. 4, 1988

[54] METHOD OF CONTROLLING GLASS FIBER FORMATION AND CONTROL SYSTEM

[75] Inventors: Larry G. Wright, Salisbury, N.C.; John J. Kuhn, Gibsonia, Pa.

[73] Assignee: PPG Industries, Inc., Pittsburgh, Pa.

[21] Appl. No.: 112,573

[22] Filed: Oct. 22, 1987

[51] Int. Cl.[4] ............................................. G03G 37/02
[52] U.S. Cl. ........................................ 65/2; 65/3.13; 65/10.1; 65/11.1; 65/29; 65/162; 65/DIG. 13
[58] Field of Search ..................... 65/DIG. 13, 2, 162, 65/3.13, 10.1, 11.1, 29

[56] References Cited

U.S. PATENT DOCUMENTS

| | | | |
|---|---|---|---|
| 3,218,138 | 11/1965 | Mennerich | 65/162 X |
| 3,274,324 | 9/1966 | Stalego | 65/162 |
| 3,471,278 | 10/1969 | Griem, Jr. | 65/2 |
| 3,652,243 | 3/1972 | Jensen et al. | 65/2 |
| 4,145,201 | 3/1979 | Phillips | 65/2 |
| 4,192,663 | 3/1980 | Schmandt et al. | 65/10.1 X |
| 4,280,827 | 7/1981 | Murphy et al. | 65/11.1 |
| 4,343,637 | 8/1982 | Shofner et al. | 65/2 |
| 4,546,485 | 10/1985 | Griffiths et al. | 373/28 |
| 4,594,087 | 6/1986 | Kuhn | 65/1 |

OTHER PUBLICATIONS

"Elementary Statistics", Bernard W. Lindgren & Donald A. Berry, Macmillan Publishing Company, Inc., New York, (1981), pp. 112–114.

Primary Examiner—Arthur Kellogg
Attorney, Agent, or Firm—Kenneth J. Stachel

[57] ABSTRACT

An improved fiber glass bushing control system. One aspect of the system has a weighing means for weighing complete collections of glass fiber strands produced from forming from a bushing through attenuation, a monitoring means for the time of attenuation at constant strand speed and a program computer means that receives signals from the weighing means and the monitoring means. The program computer means has a means for establishing a database of the weights and times, a means for determining the throughput of the glass from the bushing from the weights and times, a means for determining average throughputs and including these averages in the database, a means for comparing the average throughputs to a standard set throughput, and a means for initiating an adjustment to the main bushing temperature controller, when the average throughput deviates from the set point throughput by a value greater than the sensitivity factor of the bushing. The system has circuit means for carrying the adjustment signals to the controller and to the bushing for a temperature change. The system can have a second bushing controller connected across two sections of the bushing to regulate relative current flow in the two sections and the program computer means additionaly has means for determining the difference in throughputs between collections of strand produced from each section of the bushing at the same time and placing these difference values in the database, and a means for averaging the difference values, and a means for comparing the difference values to determine if they are other than the value of zero, and a means for adjusting the segment bushing controller to achieve average difference value in throughput other than zero.

21 Claims, 5 Drawing Sheets

METHOD OF CONTROLLING GLASS FIBER FORMATION AND CONTROL SYSTEM

The present invention relates to a system for controlling glass fiber formation, more particularly, this invention relates to a system of controlling the throughput of glass fibers produced at a forming position. Still more particularly, assuming that the attenuation equipment is controlled at a set strand speed for the fibers, a system for improving the uniformity of the diameter of filaments produced from the single forming position and multifilaments from a segmented forming position are provided.

BACKGROUND OF THE INVENTION

In a conventional fiber forming process continuous filament glass fibers are made into strand form by drawing a plurality of glass filaments through orifices located in an electrically heated platinum alloy bushing. The filaments drawn through the orifices from the molten glass contained in the bushing are gathered together in the form of a strand, and the strand is wound upon a forming tube mounted on a rotating cylinder called a collet. When the filaments are first drawn, waste strand is first collected on the edge of the collet until the winder has come up to its normal forming speed at which time the strand is caught on a rotating spiral that rotates above the surface of the collet and production strands are then wound on the tube. The spiral continues to wind production strand until the requisite number weight of filaments have been placed on the tube. This quantity is determined in a time period starting when the spiral begins rotating with the strand speed typically being generated by the winder at that forming position and continuing for the requisite number of minutes to produce a given weight of glass.

It is also conventional in this manufacture of glass fibers to control the heating of the glass fiber bushings by controls which take the form of devices such as that shown in U.S. Pat. No. 4,594,087 owned by the assignee of the instant invention. In this patent there is described a controllable, three-terminal circuit for regulating current flow in and the temperature of various sections of the fiber glass bushing. Current fed to the bushing is controlled both for the current flow to the entire bushing and to the two halves of the bushing. The importance of this latter control comes into play in those situations that utilize large collets and that form multiple forming packages on the single collet from a single bushing. It has always been an object of the manufacturing artisan in the manufacture of glass fibers to achieve as little variation as possible in fiber or filament diameter of the filaments comprising a strand in operating a glass fiber forming bushing. This filament diameter has been controlled, for the most part, by controlling the temperature of the bushing or the winding speeds from a bushing in one way or another. For example, in the case of fiber glass winding equipment, the winders have variable speed motors so that as the fibers build on the fiber forming package, the winder speed is modified for the increasing peripheral speed acquired by virtue of the increasing diameter of the package from the beginning of the winding operation. Temperature controllers such as that described in the aforementioned U.S. patent have been utilized to distribute current evenly to two sides of the bushing or to distribute current in an uneven fashion where more current is required on one side of a bushing than in another in order to balance out the weights of packages being produced. In U.S. Pat. No. 3,652,243, a method and apparatus for controlling the diameter of glass fibers is described which utilizes a computer and the time of a forming run, the down time of the winder, and the weight of a strand on a forming package to monitor winder speed and make adjustments thereto in order to produce uniform diameter fibers. The system described requires the utilization of load cells, and computations of: an average winding speed, package weight from the load cell signals, and an average fiber diameter. This system requires the transmission of signals from the rotating collet to the computer for every rotation of the winder during formation of each package. It also requires the transmission of running status signals from the motor to the computer. Ultimately, therefore, while temperature changes are made in response to all of the readings, there is no averaging of temperatures over time with respect to the operation of the bushing. The bushing temperature changes are related to variations in winder speed. Further, the system described does not provide for any method of quick recovery from upset conditions caused by process variables which are known to be distortions or by external forces.

Thus, a need exists for a more reliable system with a faster response time for determining the diameter of glass filaments formed from a multifilament glass fiber forming bushing or as stated, more particularly, of controlling the throughput of glass fibers produced at a bushing with precision so that uniform diameter of fibers is achieved. In accordance with the instant invention, such a system is now provided.

SUMMARY OF THE INVENTION

The automatic control system for the manufacture of glass filaments of the present invention reduces the coefficient of variation (COV) of the diameter of the manufactured filaments with improved, accurate adjustments and with the ability to respond quickly to upset conditions. The automated control system of the present invention is an improvement in the apparatus and method of producing glass filaments.

The present invention improves the method of manufacturing glass filaments that involves: forming a plurality of continuous glass filaments from molten glass in a fiber forming device, attenuating the filaments for cooling to solidify them into filaments by applying an attenuating force on the cooled filaments that is transmitted through the filaments to streams of molten glass issuing from the opening in the bushing, gathering the filaments into one or more bundles of filaments, collecting the bundles as packages or mats, recording through a programmed computer means at least the weight of the collection of bundles of filaments and the time of collecting the bundles, and adjusting the bushing temperature through a bushing temperature controller in response to the recorded data. The improved process involves: (a) establishing a data base through the programmed computer for the weights of completed collection of bundles of filaments and the times of attenuation of the filaments to produce the completed collections, (b) computing through the programmed computer the throughput of the glass from the bushing for each weight and its appropriate attenuation time from the established data base, (c) computing the average of the throughputs by said computing means, (d) comparing the average throughput values to a standard value of throughput, and (e) adjusting automatically through circuit connections of the programmed computer to the bushing temperature controller the temperature of the bushing when the average throughput values deviate from the standard values. The improved method can also involve: the utilization of a multisegmented bushing for producing a plurality of bundles of filaments where each segment has a controller and the method includes: (a) determining the difference in throughputs for complete collections produced at the same time in forming, (b) calculating the average for these throughput difference values, and (c) comparing the average throughput difference values from the weights of the collections and times for attenuation for the specific bushing segment to a zero value, adjusting the bushing segment controller to effect a change in bushing temperature of a segment to a zero throughput difference.

The improvement in the apparatus involves an apparatus having: a fiber forming means like a bushing for producing a plurality of continuous glass filaments, an attenuation means for issuing the filaments from the bushing, a collecting means to produce a collection of the filaments, a weighing means to weigh the collection of fibers, a monitoring means to determine the time of attenuation, a computing means programmed to apply signals from the weighing of the collection and the monitoring of the time of attenuation of the fibers and to issue output signals, a bushing temperature control means to control the electrical heating of the bushing and to receive the output signals from the computer means to adjust the temperature of the bushing, and a circuit means to transmit signals to and from the programmed computer means, where the latter signals are output signals to the bushing temperature control means and to supply the adjustment from the bushing temperature control means to the bushing. The improvement in the apparatus of the present invention comprises (A) the programmed computer means having a means to establish a database for weights and times, a means to calculate the throughputs of the filaments from the bushing by the weight of each complete collection and the time of attenuation for such collection, a means for averaging the throughputs to establish a data bank of the throughputs and the average througputs, a means to compare the average throughputs to standard throughputs, and adjustment means to modify the bushing temperature in response to a deviation of the averaged throughput from the standard throughput values, and (B) at least one circuit means to provide for transmission of signals between the programmed computer means and the bushing controller means and a power supply and between the programmed computer means and weighing means and monitoring means. In addition, the improved apparatus can have a multisegmented bushing with one additional controller for each segment of the bushing. Here the programmed computer means has a means for calculating the difference in throughputs for collections produced at the same time during forming and a second averaging means to average the values of the difference in throughputs, a second comparison means for the average difference throughput values to the throughput value of zero, and a second adjustment means to effect the bushing segment controller to change the bushing temperature of a bushing segment in response to deviations of the average difference throughput to the value of zero, and a second circuit means for passage of signals between the programmed computer means and the bushing segment controller and a power supply.

In the apparatus and method of the present invention the standard values for throughput are determined by calculating an ideal weight for the forming package and an ideal time for attenuation utilizing the weight components of the collection and the rpm of a winder or a speed of an attenuator. The weight components of a collection include that of: any core support, moisture, any chemical treatment and the glass. From the ideal weight and ideal time, the ideal throughputs can be calculated in mass per unit time or other suitable units. Also, in order to make adjustments and have adjustment means, the sensitivity of the fiber forming bushing must be determined so that an adjustment in the temperature of the bushing will result in a change of the diameter of the fiber. In the averaging step or means for averaging, utilization of any means or modified means or running means or modified means determinations is suitable. In addition, the apparatus and method may include steps or means for resetting after an upset condition and/or correction of throughput data obtained prior to adjustment to post adjustment values. Also, the weighing means and step can be accomplished through separate weighing scales or apparatus or devices electrically connected to the programmed computer or by load cells or similar weighing devices affiliated with fiber glass handling and/or attenuation equipment.

Another aspect of the present invention is an improved automatic control system for fiber glass bushings to enable the production of more uniform diameter glass filaments. This aspect of the invention is an improvement of an automatic bushing controller device for multisegmented bushings to produce glass filaments of more uniform diameter from the bushings. The bushing control device has a weighing means, a monitoring means for the time of attenuating the glass fibers, a programmed or programmable computer means, bushing temperature controller means and a controller means for each bushing segment. The improved device includes: (a) the programmed computer means having a means for establishing a data base of the weights of each completed collection of glass filaments weighed on the weighing means and the times of attenuation for the completed collection, computing means for determining the throughput for each complete collection from its weight and time of attenuation, a mean for summing the throughputs of the segments to obtain the throughput for the entire bushing, a means for subtracting simultaneous segment throughputs, averaging means to average the summed throughputs and an averaging means to average the difference throughput values, comparison means to compare the average summed throughput values to standard throughput values for throughputs from the entire bushing comparison means to compare the average difference throughputs to the value of zero, adjusting means to adjust the bushing temperature controller means to effect a change in the temperature of the bushing when the average summed throughput values deviate from the standard throughput values and to adjust the segment bushing controller to effect a change in the temperature of one or more segments of the bushing to produce a zero difference in the average throughput values between the bushing segments.

DETAILED DESCRIPTION OF THE INVENTION AND PREFERRED EMBODIMENT

Figure 1:
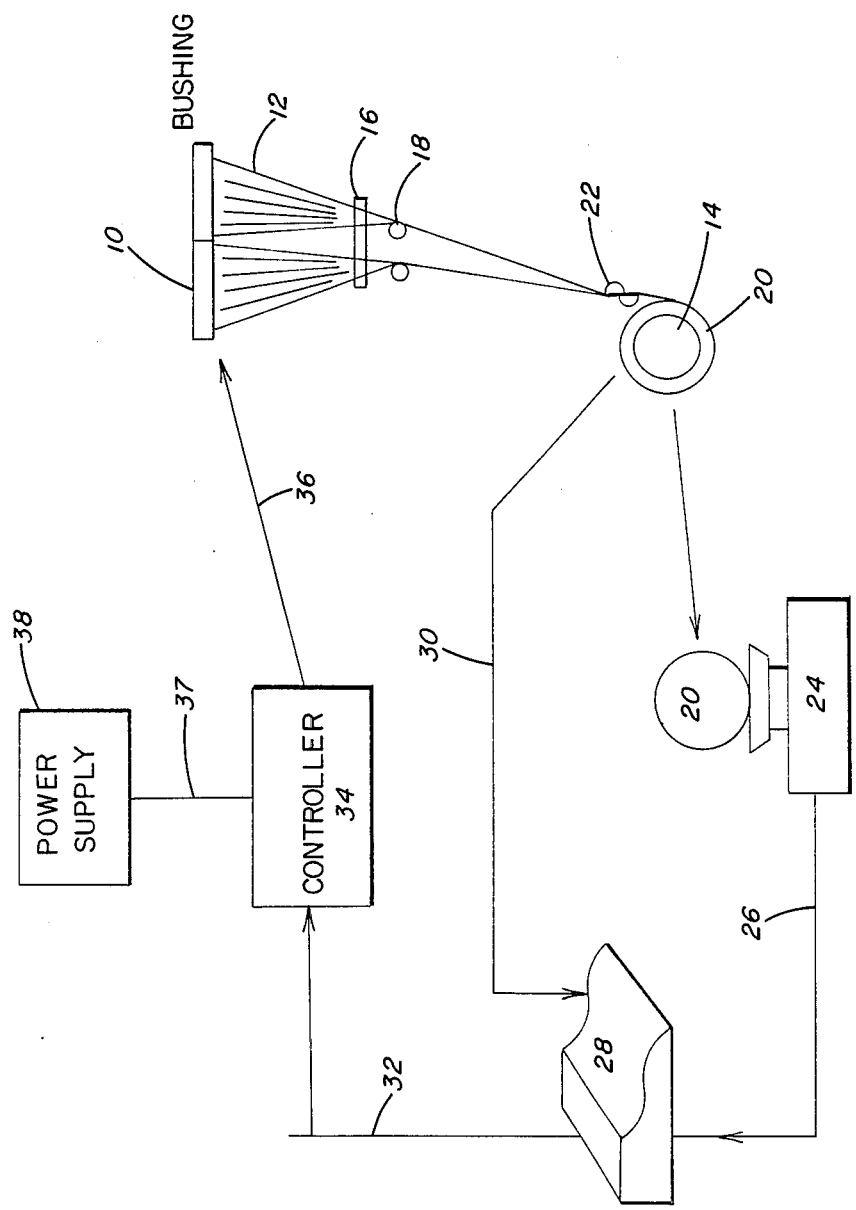
FIG. 1 is a diagrammatic illustration of the automated package weighing and controller adjustment system with the manufacture of glass fibers employing a main bushing temperature controller.

The improved automatic method and apparatus of the present invention should take into consideration several factors in establishing a type of baseline for controlled glass fiber bushing operation. Consideration of the sensitivity of the bushing, optimum bushing operation and the resolution of any of the bushing controllers enter into establishing the parameters for adjusting bushing temperature.

Bushing sensitivity is the minimum change in temperature required to effect a change in the diameter of the filaments issuing from the bushing. Determination of the sensitivity involves weighing a complete collection of formed bundles or strands of glass fiber, hereinafter referred to as 'package', and subtracting various weight components to determine bare glass weight. This weight divided by the time of attenuation of the complete package results in the calculation of the throughput of the bushing. The weight components considered include: the support tube of the package which is placed on a winder in attenuating glass fibers, the moisture of the package, and any chemical treatment applied to the fibers during preparation of the package. These components are determined by taking a wet package and removing the tube support and weighing it. Best results are achieved by weighing a number of samples and taking the average value for the weight of the tube. Removal of the tube from the packages gives a package in the wet state that is weighed before and after drying to determine the percent moisture of the package. Drying the wet package results in removal of the moisture but not the chemical solids on the filaments. The difference in weights is the weight of the moisture in the package. To determine the percent LOI one takes a sample length of strand, weighs it, burns off the organic solids in a furnace and reweighs the sample length and calculates the difference as a percent LOI based on the original sample. From these determinations the weight components of tube support, moisture, and percent LOI of any chemical treatment are added and the total subtracted from the total weight of the package to obtain the weight of bare glass. With this weight and the time of attenuation of the package at a constant strand speed, the throughput of the bushing is calculated as mass per unit time as in pounds per hour. With several of these calculations from several packages, determination of the average change in throughput per degree change in temperature, preferably a degree Fahrenheit, of the bushing gives a normal plot of the pounds per hour against bushing temperature. The sensitivity is represented by the slope of the straight line drawn through the data points or by regression analysis of the obtained data. This sensitivity determination comes into play in adjustments of the main bushing temperature controllers to change the bushing temperature.

The sensitivity of a multisegmented bushing regarding the segmented-bushing controller sometimes referred to in the art as a three-terminal bushing controller is determined in a similar manner to that for the main bushing temperature controller. The exception is the throughput of the glass as determined from the weight and the time of attenuation preferably at nearly constant strand speed is taken for various amperes of current supplied to the different segments of the bushing. The throughput is plotted versus the amperes for the particular samples and the slope of the linear relationship is the sensitivity for the bushing segment controller or three-terminal controller. This bushing controller referred to as the bushing segment-controller is more fully described in U.S. Pat. No. 4,594,087 (Kuhn) assigned to the same assignee as the present application and this patent and its disclosure of the particular three-terminal bushing controller is incorporated herein by reference.

The optimum bushing temperature operation is determined for an ideal case of achieving the best economics of production and the best quality product. With these desired goals, the throughput value for the bushing is calculated from the ideal package weight and attenuation time for the temperature of the bushing as controlled by the main bushing controller. This throughput value at its bushing temperature are used as set point values for comparison and adjustments.

FIG. 1 is a diagrammatic illustration of the improved automatic control system of the present invention. Bushing 10 has a plurality of filaments 12 issuing from it by attenuation from winder 14. Preceding gathering of the filaments into a strand, the filaments are preferably treated at applicator 16 with a chemical treatment to avoid interfilament abrasion. The filaments are gathered into a strand by a gathering device 18. The strand of the plurality of filaments is guided by spiral 22 onto a package 20 placed on winder 14. Forming packages that are completely filled with strands of glass filaments are weighed. Preferably, each time a forming package is completely filled or weighed, that forming package is weighed. This weighing as depicted in FIG. 1 is on scale 24. Alternatively, the weighing can be accomplished by weighing devices such as load cells, not shown in FIG. 1, placed on the winder 20 or any package handling apparatus (not shown). This latter method of weighing would allow continuous weighing of the strand as it is wound and placed onto the forming package. Scale 24 or a weighing load cell on the winder is electrically connected by circuit means 26 to a programmed computer 28. The programmed computer 28 is also electrically connected by circuit means 30 to the winder 14 or spiral 22. The programmed computer 28 is electrically connected by circuit means 32 to the bushing temperature controller 34. The bushing temperature controller is electrically connected by circuit means 36 to the bushing 10 and by circuit means 37 to power supply 38. The connection of the bushing temperature controller to the bushing is similar to that shown in the aforesaid U.S. Pat. No. 4,594,087 as a main temperature controller and its connection to the bushing and its power supply from AC Power through a power pack is shown and illustrated therein, and this patent is hereby incorporated by reference. In addition a plurality of temperature sensing devices such as thermocouples are connected to the bushing not shown in FIG. 1 but similar to that shown in FIG. 2, to provide output signals which are supplied to a temperature averaging circuit, the output voltage of which represents the average temperature of the bushing which is supplied to the main temperature controller. A useful temperature averaging circuit is that illustrated, shown, and disclosed in U.S. Pat. No. 4,546,485 (Griffiths et al) assigned to the same assignee as the present application and this patent is hereby incorporated by reference.

The programmed computer means 28 monitors by monitoring means 39 the start and stop time of the spiral 22 which runs when the strand is moving at a near constant speed as provided by winder 14. Monitoring means 39 can be like that disclosed in U.S. Pat. No. 3,652,243 for computer monitoring of the running time and this patent is incorporated herein by reference for such disclosure. Preferably, the monitoring means involves a relay in an A.C. variable frequency inverter circuit for controlling the acceleration and deceleration of the winder, and this relay monitors spiral run status. This relay is electrically connected by circuit means 30 to programmed computer means 28 to signal it when the spiral starts and stops. The spiral starting and stopping is preferably used to determine attenuation time, since it operates when there is near constant strand speed. Only near constancy exists since incorrect settings of the inverter frequency or slippage in the induction motor of the winder and the nonlinearity of package building will cause deviations from constancy. Also, program computer 28 receives the weight of package 20 through circuit means 26. Computer 28 has means to establish a database of the weights and times of attenuation for each completed package 20. Such means can include conventional storage means for computers as known to those skilled in the art. Preferably, the program computer is a Hewlett-Packard-9826 personal computer with floppy disk storage medium. In addition, the program computer has a means to calculate a throughput value from each package weight an attenuation time for that particular package by the formula:

Pounds/hour = 
$$\frac{\left(1 - \frac{\% \text{ moisture}}{100}\right)\left(1 - \frac{\% \text{ LOI}}{100}\right)}{\text{Winding Time}} \text{ (PACKAGE Weight } -$$

Equation 1

Tube Weight)

In Equation 1 the percent moisture, percent LOI and tube weights are determined in a similar fashion to that of the aforementioned manner for determining the sensitivity and standard (optimum) values. Any program, program segment subroutine, or loop of a program that accomplishes the running of this equation with the data in the database can be used. This calculated throughput can be added to the database. The programmed computer also has a means for calculating the average of the calculated throughput values and this means can be any program or program segment or hardware incorporating such program, subroutine of a program or loop of a program to accomplish the averaging by determining the mean or a modified mean or a running mean or running modified mean. For example, the preferred means of averaging is a program segment to determine the running trimmed mean. The running trimmed mean continuously averages a set number of throughput values, the preferred number is 5, and such a mean does not include in determining the average the highest and lowest throughput values within the selected set of numbers. Since a running trimmed means requires several values of average throughput, prior to obtaining these values the average preferably is a standard average. For instance, when one package has been weighed, its throughput value is compared to the throughput for optimum operation, and an adjustment is made if required. On obtaining additional throughput values but less than those needed for a trimmed means calculation of the average of the obtained throughput values involves summing the values and dividing by the number of values summed to determine the average throughput. This average throughput is compared to the last adjusted throughput, or if none, to the standard throughput and an adjustment is made if required to bring the average value to the optimum value. In each calculation of the average throughput the average values can be added to the database.

The programmed computer also has a means for comparing the average throughput value with a set throughput value (standard or optimum value). The comparison is achieved through a program or program segment or hardware incorporated into the programmed computer 28 with appropriate access to the proper database which includes the sensitivity of the particular bushing as calculated in the aforementioned manner. The programmed computer for such comparison uses the following equation:

Change in Bushing Temperature =

$$\frac{\text{(Pounds per Hour } - \text{ Average Pounds per Hour)}}{[(\text{Pounds per Hour})(\text{the Sensitivity Factor})]}$$

Equation 2

From Equation 2 when the change in set point value is greater than the sensitivity by a meaningful difference, the programmed computer 28 also has a means for adjusting the set point via circuit means 32 for main bushing temperature controller 34. The temperature controller 34 effects the change in set point temperature through circuit means 36 to bushing 10. The adjustment means of the programmed computer 28 can be any program or segment subroutine or loop of a program that accomplishes the adjustment through the bushing controller to bushing 10. Circuit 32 or computer 28 or bushing controller 34 can have any appropriate interface circuitry to allow for the adjustment of the controller. The new adjusted temperature set point then becomes the standard set point for any future adjustments.

Figure 2:
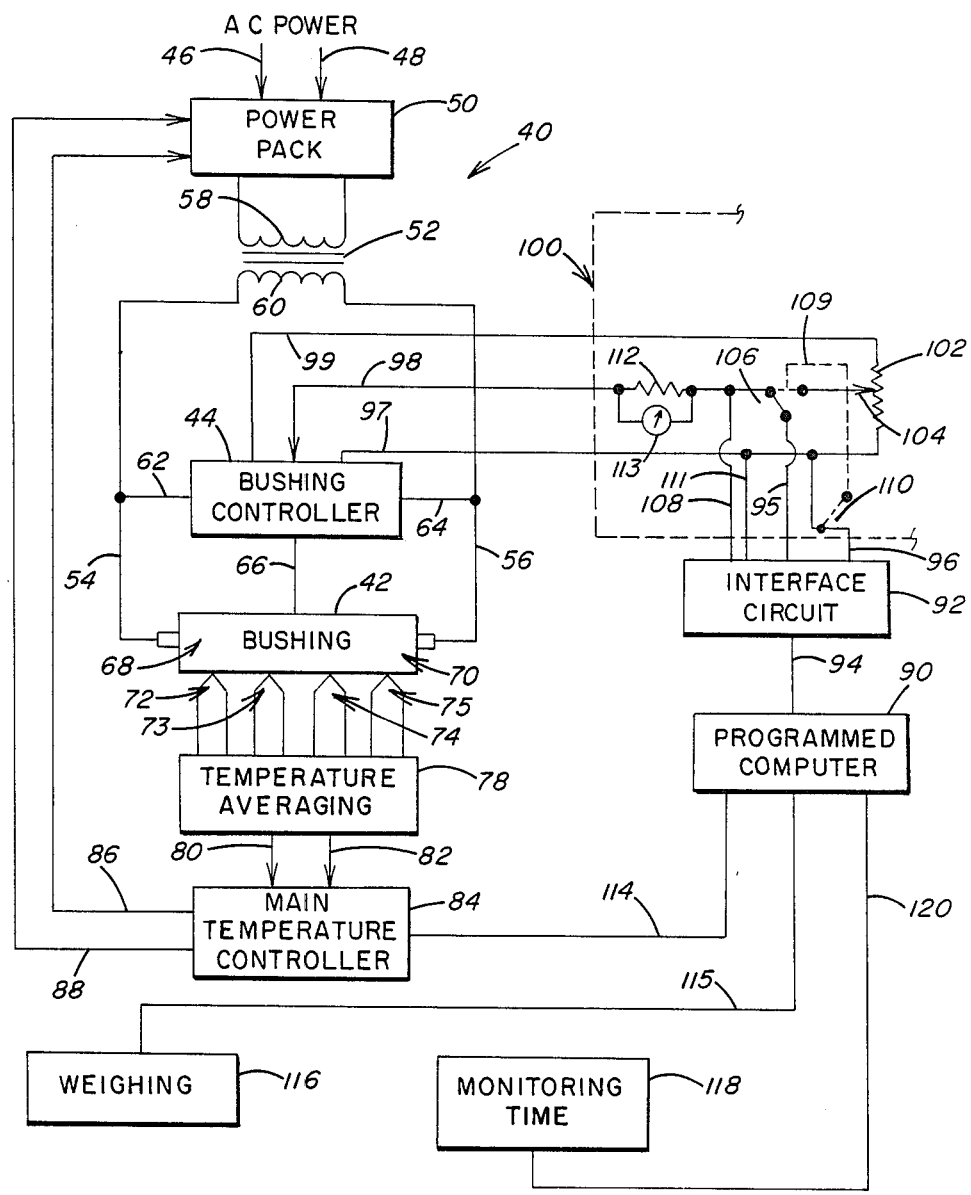
FIG. 2 is a diagrammatic illustration of the automated package weighing and controller system for a main temperature controller and a bushing controller.

Referring now to the diagrammatic illustration of FIG. 2, there is illustrated at 40 a temperature control system for a conventional fiber glass bushing 42, the system including at 44 a three-terminal bushing in accordance with U.S. Pat. No. 4,594,087 already incorporated herein by reference. The system includes a pair of input power lines 46 and 48 by which AC power is supplied to the bushing by way of a power pack 50, a power transformer 52 and power lines 54 and 56. The power pack 50 supplies AC power to the primary winding 58 of transformer 52, and secondary winding 60 is connected to lines 54 and 56. A pair of input leads 62 and 64 connect the bushing segment controller 44 across lines 54 and 56 to thereby connect the controller in parallel to the bushing 42 and to the secondary winding 60. The bushing controller is also connected by way of a current bypass line 66 to an intermediate tab on the bushing 42, to thereby segment the bushing into sections 68 and 70.

It will be understood that the bushing 42 incorporates a multiplicity of orifices (not shown) from which glass fibers are drawn, similar to that shown in FIG. 1. The fibers drawn from 68 may be formed into one strand, while the fibers formed from section 70 may be drawn into a second strand, where prior to gathering into strands each multiplicity of fibers is preferably treated with a chemical treatment by an applicator. The two strands are directed to a collet to form a first and second (or "front" and "back") strand packages on the winder where a spiral for each package is used. Strands are formed by an equal number of fibers so that if the temperatures of the two bushing sections are equal, the fibers produced by the respective orifices will be essentially equal in diameter, and the packages formed on the winder in a given time period will have essentially equal weights.

A plurality of temperature sensing devices, such as thermocouples 72, 73, 74 and 75, are connected to the bushing 42 to provide output signals which are supplied to a temperature averaging circuit 78 which may be of the type illustrated in the aforesaid U.S. Pat. No. 4,456,485. The temperature averaging circuit 78 produces an output signal on cables 80 and 82 which represents the average temperature of the bushing 42. The signal is supplied to a main temperature controller 84, which produces a main temperature control signal on cables 86 and 88. The main temperature control signal is supplied to power pack 50, which in turn adjusts the current supply to the primary coil 58 of transformer 52 to thereby regulate the power supplied by way of transformer 52 to bushing 42.

The main temperature controller 84 thus responds to the average temperature of the bushing 42 to regulate the power supply from the AC power source; however, controller 84 cannot identify nor correct variations in temperatures along the length of the bushing. More specifically, controller 84 cannot correct the difference in temperatures between, for example, segments 68 and 70. Control of the latter differences is accomplished by bushing controller 44 by means of control signals supplied from programmed computer 90 which may be remotely located from the environment of bushing 42.

Figure 3A:
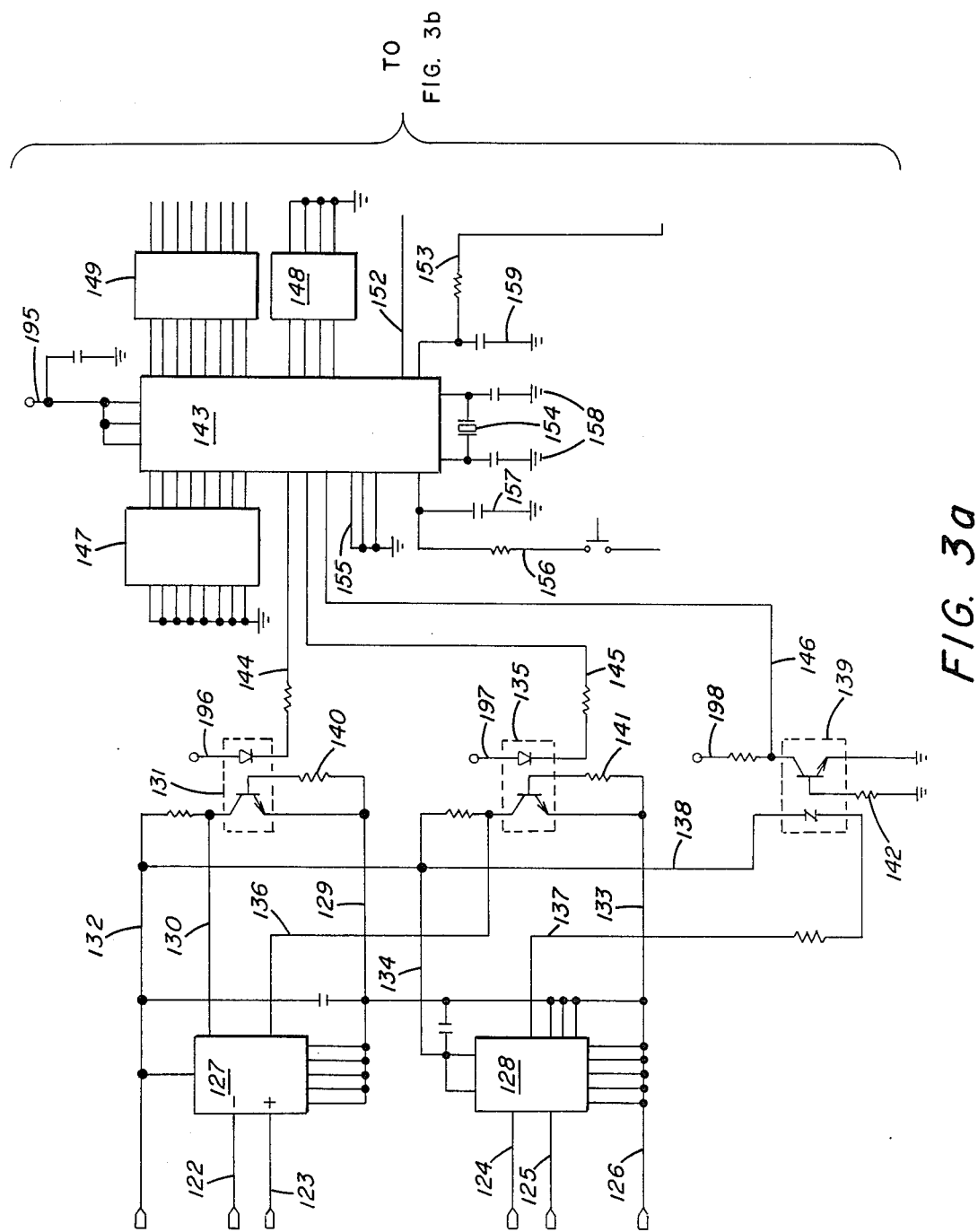
FIGS. 3a, 3b and 3c are schematic diagrams of a circuit for interfacing the programmed computer means and the segment bushing controller.
Figure 3B:
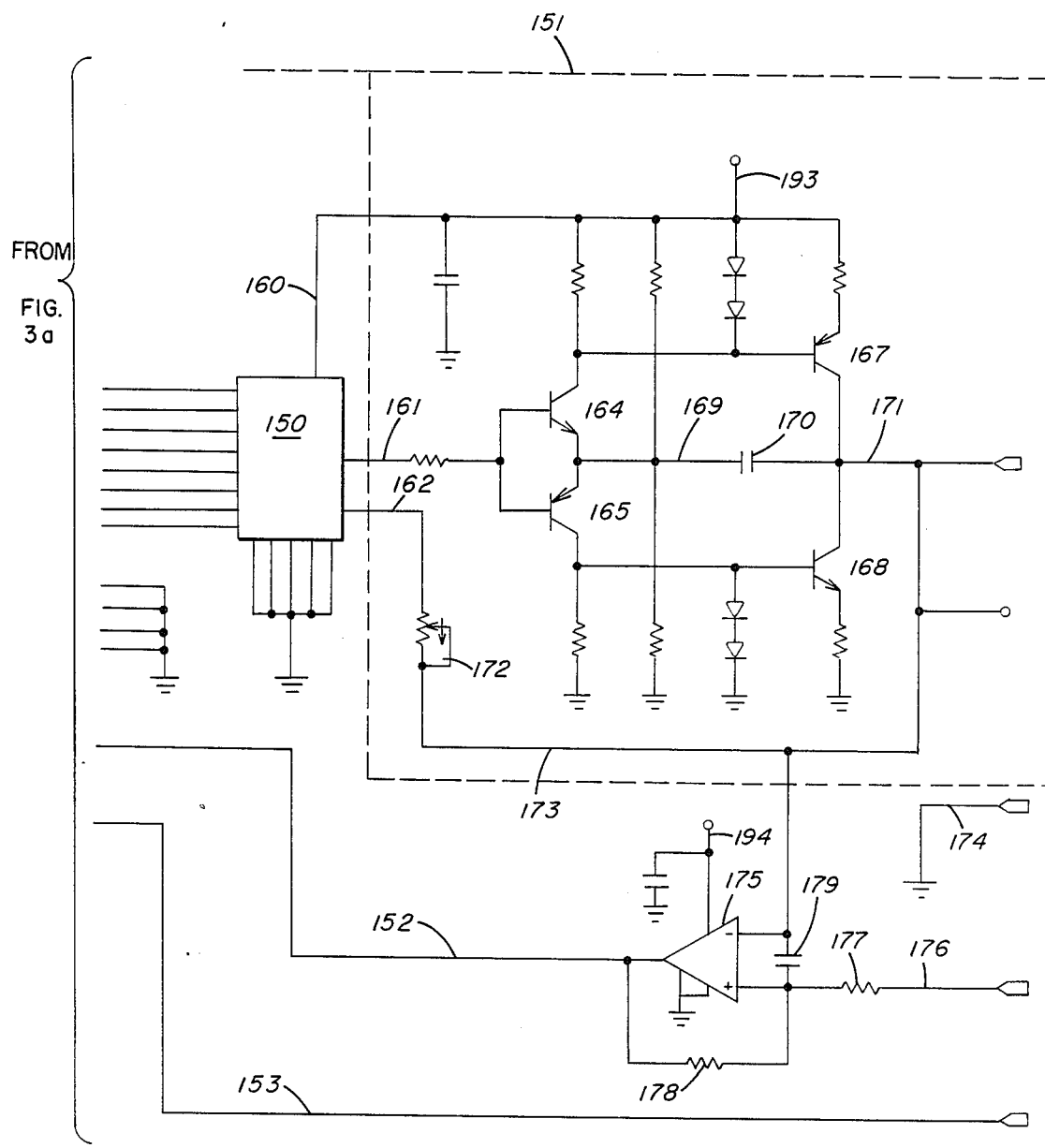
Figure 3C:
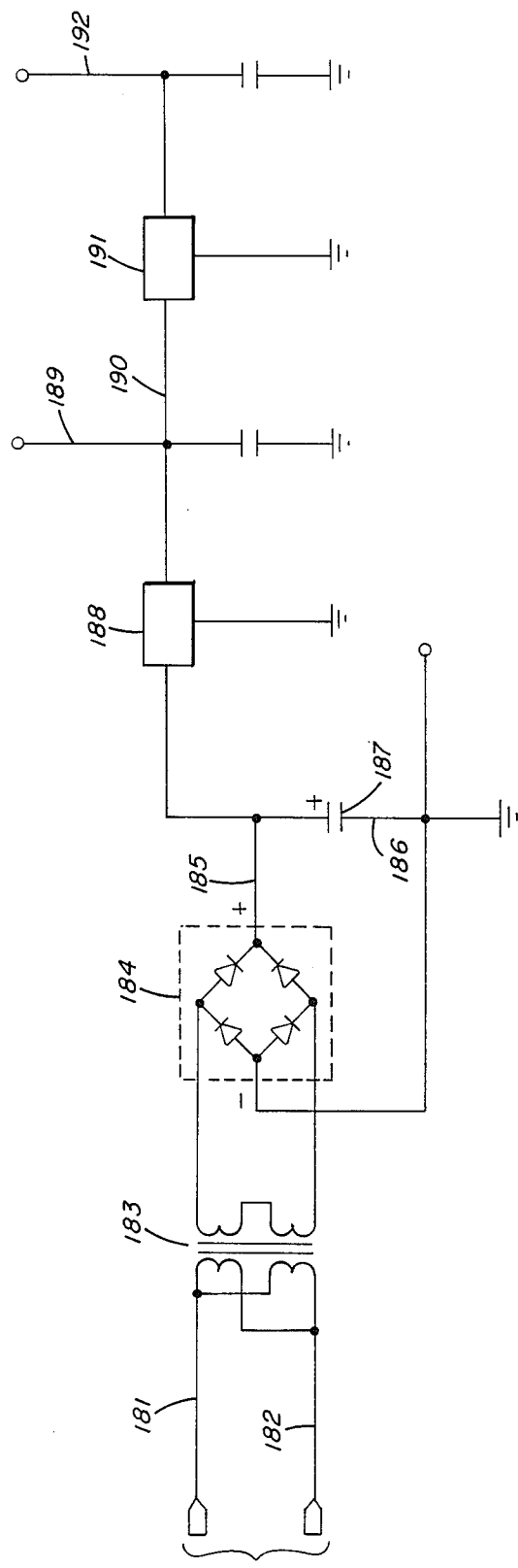

The programmed computer is connected to an interface circuit 92 by cable 94. Any interface circuitry for electrically connecting computer output to electrical control circuitry known to those skilled in the art may be used. Preferably, the interface circuitry depicted in FIGS. 3a, 3b and 3c is used. The interface circuitry 92 is electrically connected by cables 95 and 96 through switches 106 and 110, respectively, to cables 97 and 98, respectively, from bushing segment controller 44. These connections are preferably in control panel 100. Cables 97 and 99 from bushing segment controller 44 provide negative and positive supply voltage for the control panel, and lead 98 carries a set point control signal of selected polarity and magnitude in either: the automatic or manual mode. In the automatic mode the signal is from the computer means 90 via the interface circuitry via cable 95 for automatic adjustment of the set point. Cables 95 and 96 perform in the above described manner when switches 106 and 110 are closed to contact cables 95 and 96 respectively. For manual operation the negative and positive supply voltages on leads 97 and 99 are connected in the control panel 100 to opposite ends of a potentiometer 102 having an adjustable slide top 104. In the manual adjustment of the set point a voltage of desired polarity and magnitude is selected from the potentiometer 102 by adjusting the position of the slide wire with switches 106 and 110 closed to contact cable 109 to close the circuit for potentiometer 102. In both automatic and manual modes the set point signal on cable 98 travels through resistor 112 and preferably a voltmeter 113 is connected across resistor 112 to measure the control signal supplied to lead 98. Cables 108 and 111 are electrically connected to cables 97 and 98, respectively, of the bushing segment controller 44. These cables allow the computer means 90 through the interface circuit 92 to monitor any manual adjustment made through potentiometer 102. In addition, the programmed computer 90 is electrically connected by cable 114 to the main temperature controller 84. Also, the computer 90 is electrically connected by cable 115 to a weighing means 98. The weighing means can be a scale or a load cell on a fiber glass package handling or winding device. An example of the load cell would be one located on the winder as in FIG. 1 or located on a conveyor which transports a package from a forming operation to another location. Also, the computer 90 is electrically connected by cable 120 to an attenuation time monitoring device 118. The attenuation time monitoring device can be any means known to those skilled in the art to monitor the attenuation time preferably at near constant strand speed. Preferably, the time monitoring means is the relay for the spirals in the inverter circuitry of the winder as aforedescribed.

The programmed computer means 90 interacts with the main temperature controller 84 in the same manner as depicted in FIG. 1 for establishing the database, monitoring the attenuation time and weighing means, calculating the throughput, averaging the throughput, comparing the average throughput to set point throughput values and performing adjustments. In addition, programmed computer means 90 has similar means for relating to bushing controller 84. In a similar fashion to that discussed for FIG. 1 the programmed computer has a means for establishing a database of weights of complete packages and their times of attenuation and determining the throughput for individual packages. In addition, the database means allows the correlation of the throughput values for "front" and "back" packages or packages produced from the segmented bushing at the same time. The bushing can have any number of segments with the appropriate number of three-terminal bushing controllers. The programmed computer means 90 has a means for determining the difference of throughputs between the number of packages produced at the same time with their specific attenuation times. Also, the programmed computer means 90 has a means for averaging these differences in throughputs by a standard average or modified mean average method or any running standard mean averaging method or running modified mean averaging method such as running trimmed mean averaging. When the average of the throughput differences is not zero, the programmed computer means 90 has a means for communicating through the three-terminal bushing controller for an adjustment to the bushing to make the average difference in throughput equal to zero. The programmed computer means 90 accomplishes the adjustment by sending a signal to the bushing controller which converts, if necessary, to a compatible signal for comparison to the thermocouple signals to the controller 85 or 44. One or both controllers in response to the comparison can send an analog voltage to the power pack to increase or decrease the voltage in the bushing for the main bushing controller or the current for the bushing segment controller. An increase in voltage or current (amperes) increases the temperature, and a decrease in either decreases the temperature.

Alternatively, one or more of the aforementioned means in the programmed computer means can exist as hardware. For instance, a standard average can be obtained by a thermocouple average device such as the temperature averaging circuit 77. Any averaging circuit known to those skilled in the art can be used with proper selection of components and component values corresponding to those of the program for performing the same function. The comparison means can be hardware analog circuitry including comparator circuitry, summing amplifier circuitry or subtraction circuitry. When the foregoing means of the programmable computer exists in the program, they can exist as subprograms, program segments, subroutines and loops.

The method of the present invention in its broadest scope of the improvement involves: (a) establishing a database on the programmed computer for the weights and times of attenuation, where the latter is preferably for near constant attenuation speed of the strand. From this established database, the programmed computer computes the throughput of the glass from the bushing from the established weights and times, for instance, in pounds per hour. With the throughput determination the programmed computer computes an average, preferably a running trimmed mean average using a range of specimens of five. This average is compared by the programmed computer against standard (optimum) values of throughput obtained in the aforementioned manner from the best economic, processability and quality characteristics in producing glass fibers. These characteristics are determined from trying to obtain the maximum throughput of glass while achieving good handleability and avoiding flooding of the bushing and reducing breakouts of the fibers. In weighing the fibers to obtain data for the database, weighing can be conducted on a scale or by load cells arranged on the winder or any conveyor removing the package from its forming location. For instance, strain gauges can be located at four corners on the winder to weight the winder and the top half of the winder base along with the package of glass fibers and then subtracting for the weight of the winder and the top half of the winder base. When the average value of throughput deviates from the standard throughput value by an amount greater than the resolution capability of the controller, an adjustment is made to bring the average closer to the set point throughput by changing the temperature at the bushing through the controller. Before sufficient values are accumulated for using a running trimmed means, the sole available value or a standard average is used as previously described.

In the narrower scope of the method of the improvement of the present invention, the programmed computing means establishes a database of differences in throughput from packages produced at the same time on the same winder from different segments of a segmented bushing. These differences in throughput are averaged, preferably by running trimmed mean average, and the average is compared to the value zero and adjusting the temperature of the bushing segments relative to each other through the three-terminal bushing controller to obtain an average value of zero.

In addition, the improved controller system of the present invention can have a means and method for improving response time of a control system in adjusting the bushing temperature. In the broadest aspect of the present invention the main temperature controller is the only controller for the bushing and response time is improved by a means or method of correcting the historical data recorded prior to an adjustment in bushing temperature. The correction is produced by the programmed computer means revising the throughput data in the database to add to or subtract from the recorded throughputs an amount as though the set point were the adjusted set point. This is accomplished by the equation:

New (Pounds/hour) Throughput = (Equation 3)

(Old Throughput Usually in Pounds/Hour) (1 +

[(Change in $T$ Set Point) ×

(the Sensitivity Factor for the Bushing for a Temperature Change)])

In the aspect of the improved controller system of the present invention where two controllers are used, the main temperature controller and the segmented bushing controllers, the established database for the segmented bushing controller is also corrected after an adjustment of the bushing temperature through the controllers. This involves correcting data of the difference in throughput between the packages produced at the same time on the same winder. This is accomplished for a segmented bushing controller that controls current by the following equations:

New front package throughput in pounds/hour = Equation 4 old front package throughput in pounds/hour −

[the change in current/(bushing sensitivity for courrent change ×

$n$)]

New back package throughput in pounds/hour = Equation 5 old back package throughput in pounds/hour +

[the change in current/(bushing sensitivity for current change ×

$n$)]

In equations 4 and 5 "n" is a whole number equal to the number of segments in the bushing.

In addition the improved controller system of the present invention may have a means or method for responding quickly in the event of a process upset. For instance, the process may have a component adjustment in the components of manufacturing glass fibers, and the control system should stabilize after such an adjustment in fairly quick order. This is accomplished by having a means or method for establishing the number of consecutive throughputs having a certain value deviation from the target that will be acceptable. For instance, two consecutive throughputs of greater than or less than 1 percent of the target would indicate an upset condition. Alternatively or additionally, if there is an increase of 1 percent or more in the difference of throughputs between the packages produced on a segmented bushing at the same time, an upset condition is indicated. Another or an additional upset condition is there can be an external set point adjustment for emergency purposes.

When one or more of these conditions is met, all of the data in the established databank is ignored and data accumulation begins anew.

PREFERRED EMBODIMENT OF THE INVENTION

Utilization of the multisegmented bushing allows for the production of multiple packages on a winding apparatus and permits the use of larger, more economical bushings. The multisegmented bushing entails the presence of two types of bushing controllers. The first is the main temperature bushing controller to control the temperature of the entire bushing, and the second is one or more segmented bushing controllers, or three-terminal controllers, to refine the temperature of each segment of the bushing. It is preferred to use the segmented bushing controller disclosed in U.S. Pat. No. 4,594,087 incorporated herein by reference with the circuit connections as shown in FIG. 2. Accomplishment of weighing of all the completed packages of strand is on a scale electrically connected with the programmed computer. Performance of monitoring of attenuation time at near constant strand speed is by a device such as electrical connection to the inverter relays for the strand spirals. With the weight of the package and the time of attenuation communicated to the programmed computer the computer has the means and performs the method of: establishing a database, calculating throughputs, averaging throughputs, calculating differences in throughputs and averaging the differences between throughputs for packages produced from different segments of the segmented bushing at the same time, comparing the average throughputs to a standard throughput value and comparing the averaged difference values between throughputs to a value of zero, and adjusting the main temperature controller when the average throughput exceeds the set point throughput by an amount greater than the resolution capability of the controller to be closer to the set point and adjusting the segment bushing controller to return to an average of zero when the average of the throughput differences is other than zero. In addition, it is preferred to have the means and method of adjusting already recorded data for correction for any adjustment of bushing temperature and to discard all of the data when a defined upset condition is encountered in order to begin anew to establish the databases. Preferably, these means and methods are carried out by the following program.

```
Line 10-150 - General Remarks:

!
!CLSD_LP24
!
!COPYRIGHT PPG INDUSTRIES, INC. 10/19/87  ALL RIGHTS RESERVED
!
!MONITOR EUROTHERM & 3 TERMINAL CONTROLLERS & SCALE
! & RUNNING TIME THEN CALCULATE LB/HR & ADJUST CONTROLLERS
!
!TO SET TIME & DATE TYPE:
! SET TIMEDATE DATE("19 JUL 1985")+TIME("14:24:30")
!
!TO START PROCESS COMPUTER SPIRAL RUN STATUS TYPE:
! CTRL<BREAK> --- JKUHN <RETURN>
!
! GOSUB Init_cal 160 Main:   !
170         GOSUB Scale
180         GOSUB Spiral_scan
190         GOSUB Controller_scan
200         GOTO Main
210         !
220         !
230         !
240 Init_cal:  !
250         !INITIALIZE CLOCK
260         DIM Td$[50],Mon$(1:12)[3],Proc$[50]
270         Mon$(1)="JAN"
280         Mon$(2)="FEB"
290         Mon$(3)="MAR"
300         Mon$(4)="APR"
310         Mon$(5)="MAY"
320         Mon$(6)="JUN"
330         Mon$(7)="JUL"
340         Mon$(8)="AUG"
350         Mon$(9)="SEP"
360         Mon$(10)="OCT"
370         Mon$(11)="NOV"
380         Mon$(12)="DEC"
390         !
400         CONTROL 8,0;1          !RESET SERIAL PORT
410         CONTROL 8,3;9600       !9600 BITS/SEC
420         CONTROL 8,4;26         !7 BITS/CHAR, EVEN PARITY, 1 STOP BIT
430         !
```

```
440      Conversion$=CHR$(0)&CHR$(32)&CHR$(10)&CHR$(32)&CHR$(13)&CHR$(32)&CHR$(2)&CHR$
(10)
450      ASSIGN @Port TO 8;CONVERT IN BY PAIRS Conversion$
460      Time_date_req=1
470      GOSUB Spiral_update
480      !
490      !RESET INTERFACE CARDS
500      CONTROL 9,0;1                    !EUROTHERM & 3 TERMINAL CONTROLLERS
510      CONTROL 9,3;1200                 ! 1200 BITS/SEC
520      CONTROL 9,4;30                   ! 7 BITS/CHAR, EVEN PARITY, 2 STOP BITS
530      CONTROL 10,0;1                   !SAUTER MULTISCALE
540      CONTROL 10,3;1200     ! 1200 BITS/SEC
550      CONTROL 10,4;30       ! 7 BITS/CHAR, EVEN PARITY, 2 STOP BITS
560      CONTROL 11,0;1                   !TERMINAL ADM3 AT SCALE
570!!!   CONTROL 11,3;19200    ! 19200 BITS/SEC
580      CONTROL 11,3;4800     ! 4800 BITS/SEC
590      CONTROL 11,4;30       ! 7 BITS/CHAR, EVEN PARITY, 2 STOP BITS
600!!!
610!!!CONTROL 12;1                        !GPIO, SPIRAL CONTACTS
620      CONTROL 13,0;1                   !TERMINAL ADM3 AT COMPUTER
630      CONTROL 13,3;19200    ! 19200 BITS/SEC
640      CONTROL 13,4;30       ! 7 BITS/CHAR, EVEN PARITY, 1 STOP BIT
650      !
660      DIM Ss$(1)[5], Adc_data(3),Z$[100]
670      DIM B(5,2),C$(24)[80],A$(9)[2]
680      INTEGER Spiral_status,Prev_sprl_stat,Change_bit,Pos,Scale_err,Scale_dyn&Pkg_
ctr,Change,Eu_err,Tt_err,Full_disk,Update_disk,Hgt10,Rlt20,Rgt10
690      INTEGER Fb_wt,Comp_info,Store_flag,Scale_line,Data_ok,I
700      COM /Io/ @File,@Buff,@Device,Y$[32000] BUFFER
710      Ss$(0)="STOP"
720      Ss$(1)="START"
730      Last_update=TIMEDATE
740!!!Imax=45
750      Imax=28              !MAXIMUM 3 TERMINAL CONTROLLER CURRENT (AMPERES)
760      !
770      !DEFINE SOFT KEYS
780      GOSUB Device
790      GOSUB Start_stop
800      ON KEY 4 LABEL "100000'S",1 GOSUB I100000
810      ON KEY 5 LABEL "10000'S",1 GOSUB I10000
820      ON KEY 6 LABEL "1000'S",1 GOSUB I1000
830      ON KEY 0 LABEL "SAVE DATA",1 GOSUB Store_data
840      ON KEY 1 LABEL "LIST TO",1 GOSUB List_data
850      ON KEY 7 LABEL "100'S",1 GOSUB I100
860      ON KEY 8 LABEL "10'S",1 GOSUB I10
870      ON KEY 9 LABEL "1'S",1 GOSUB I1
880      !
890      !INITIALIZE DATA LOG
900      !CREATE BDAT "LOG",2.E+5,52 !50 CHARACTER STRING + 2 BYTES (10.4 MBYTE)
910      !CREATE BDAT "LOG",99840,52 !50 CHARACTER STRING + 2 BYTES (5.2 MBYTE)
920      ASSIGN @Log TO "LOG"
930      STATUS @Log,7;Rec
940      Rec=Rec-1
950      CALL Log_event(Rec,"","PROGRAM START")
960      !
970      !CLEAR VIDEO DISPLAY TERMINAL
980      GOSUB Clr_scrn_buff
990      C$(23)=""
1000     GOSUB Print_screen
1010     !
1020     !INITIALIZE SCALE
1030     CALL Scale_init(Scale_err)
1040     IF Scale_err=1 THEN CALL Scale_init(Scale_err)
1050     GOSUB Scale_off_line
1060     !
1070     !CONFIGURE DATA ARRAY.
1080     ! D(N,0) IS SET TO 1 IF POSITION N IS
1090     !   BEING MONITORED.
1100     ! D(N,1) CONTAINS THE SPIRAL GPIO
1110     !   NUMBER (0 TO 15).
1120     ! D(N,2) IS SET TO 1 IF AN AUTOMATIC
1130     !   WINDER IS IN USE.
1140     ! D(N,3) IS SET TO 1 IF A EUROTHERM
```

```
1150    !  CONTROLLER IS LINKED TO THE COMPUTER.
1160    !  D(N,4) IS SET TO 1 IF THE EUROTHERM
1170    !    CONTROLLER IS UNDER PROGRAM CONTROL.
1180    !  D(N,5) IS EUROTHERM GID (0-15).
1190    !  D(N,6) IS EUROTHERM UID (0-15).
1200    !  D(N,7) IS SET TO 1 IF A THREE
1210    !    TERMINAL CONTROLLER IS INSTALLED.
1220    !  D(N,8) IS SET TO 1 IF THE THREE
1230    !    TERMINAL CONTROLLER IS UNDER PROGRAM
1240    !    CONTROL.
1250    !  D(N,9) IS THREE-TERM ID.
1260    !  D(N,10) IS THREE_TERM_STPT.
1270    !  D(N,11) IS EURO_STPT.
1280    !  D(N,12) IS SET TO 1 IF THE WINDER
1290    !    IS RUNNING.
1300    !  D(N,13) CONTAINS A FRONT PKG WEIGHT
1310    !    IF ENTERED SINCE THE LAST WINDER STOP.
1320    !  D(N,14) CONTAINS A BACK PKG WEIGHT
1330    !    IF ENTERED SINCE THE LAST WINDER STOP.
1340    !  D(N,15) THROUGH D(N,20)
1350    !    CONTAIN TIMEDATE FOR THE LAST 6 SPIRAL
1360    !    EVENTS. 15 IS MOST RECENT.
1370    !  D(N,21) THROUGH D(N,35) CONTAIN
1380    !    FRONT & BACK LB/HR & CALLDOWN TIMEDATE FOR THE
1390    !    LAST 5 PACKAGE SETS. 21,22,23 IS MOST RECENT.
1400    !  D(N,36) CONTAINS TARGET GLASS FLOW (LB/HR).
1410    !  D(N,37) CONTAINS PKG MOISTURE CONTENT (e.g. '.09' FOR 9% H2O).
1420    !  D(N,38) CONTAINS LOI (e.g. '.01' FOR 1% LOI).
1430    !  D(N,39) CONTAINS 3 TERMINAL CONTROLLER SENSITIVITY (LB/A).
1440    !  D(N,40) CONTAINS NOMINAL CALLDOWN TIME (SEC).
1450    !  N IS AN INTEGER FROM Start_pos TO Start_pos+9 AND
1460    !    CORRESPONDS TO FOREHEARTH POSITION.
1470    !
1480  !!Start_pos=1
1490    Start_pos=57
1500    ALLOCATE D(Start_pos:Start_pos+9,40),Eu_line(Start_pos:Start_pos+9),Tt_line
(Start_pos:Start_pos+9),Stpt_change(Start_pos:Start_pos+9,3)
1510    ALLOCATE Last-hi(Start_pos:Start_pos+9),Last_lo(Start_pos:Start_pos+9)
1520  !!Lb_hr_spec=70.6
1530    Lb_hr_spec=71.18
1531    Lb_hr_target=Lb_hr_spec
1540    Tot_lb_hr1=Lb_hr_spec
1550    Tot_lb_hr2=Lb_hr_spec
1560    Tot_lb_hr3=Lb_hr_spec
1570    !ASSIGN @Data TO "DATA"
1580    !ENTER @Data;D(*),Rec
1590    !ASSIGN @Data TO *
1600    RESTORE Init_cal
1610    !    0  1 2 3 4  5  6 7 8    9   36    37    38    39  40
1620    DATA 1, 0,0,1,1, 0, 0,1,1,   0,71.2,.111,.011,.070,1930    !POS 1   57
1630    DATA 1, 1,0,1,1, 0, 1,1,1,   1,71.2,.111,.011,.070,1930    !POS 2   58
1640    DATA 1, 2,0,1,1, 0, 2,1,1,   2,71.2,.111,.011,.070,1930    !POS 3   59
1650    DATA 1, 3,0,1,1, 0, 3,1,1,   3,71.2,.111,.011,.070,1930    !POS 4   60
1660    DATA 1, 4,0,1,1, 0, 4,1,1,   4,71.2,.111,.011,.070,1930    !POS 5   61
1670    DATA 1, 5,0,1,1, 0, 5,1,1,   5,71.2,.111,.011,.070,1930    !POS 6   62
1680    DATA 1, 6,0,1,1, 0, 6,1,1,   6,71.2,.111,.011,.070,1930    !POS 7   63
1690    DATA 1, 7,0,1,1, 0, 7,1,1,   7,71.2,.111,.011,.070,1930    !POS 8   64
1700    DATA 1, 8,0,1,1, 0, 8,1,1,   8,71.2,.111,.011,.070,1930    !POS 9   65
1710    DATA 1, 9,0,1,1, 0, 9,1,1,   9,71.2,.111,.011,.070,1930    !POS 10  66
1720    !    0, 1 2 3 4  5   6 7 8   9   36    37    38    39  40
1730    FOR I=Start_pos TO Start_pos+9
1740       FOR J=0 TO 9
1750          READ D(I,J)
1760       NEXT J
1770       FOR J=36 TO 40
1780          READ D(I,J)
1790       NEXT J
1800    NEXT I
1810    FOR I=Start_pos TO Start_pos+9
1820       IF ((D(I,0)=1) AND (D(I,3)=1)) THEN
1830          CALL Euro_read_stpt(D(I,5),D(I,6),D(I,11),Eu_err)
1840          IF Eu_err THEN CALL Euro_read_sptp(D(I,5),D(I,6),D(I,11),Eu_err)
1850          GOSUB Euro_off_line
```

```
1860        END IF
1870        IF ((D(I,0)=1) and (D(I,7)=1)) THEN
1880           CALL Tt-read_stpt(D(I,9),D(I,10),Tt_err)
1890           IF Tt_err THEN CALL Tt_read_stpt(D(I,9),D(I,10),Tt_err)
1900           GOSUB Tt_off_line
1910        END IF
1920        FOR J=13 TO 35
1930           D(I,J)=0
1940        NEXT J
1950     NEXT I
1960     !
1970     !SET UP A$ (POSITION VS GPIO BIT).
1980     FOR I=0 TO 9
1990        A$(I)="0"
2000     NEXT I
2010     FOR I=Start_pos TO Start_pos+9
2020        IF D(I,0)=1 THEN
2030           A$(D(I,1))=VAL$(I)
2040        END IF
2050     NEXT I
2060     !
2070     !CALC INITIAL VALUE OF VARIABLE 'CHANGE'
2080     Change=0
2090     FOR I=Start_pos TO Start_pos+9
2100        IF D(I,0)=1 THEN
2110           Change=Change+2/1(D(I,1))
2120        END IF
2130     NEXT I
2140     !
2150     !INITIALIZE SPIRAL STATUS & LOG
2160!!
2170!!STATUS 12,3;Spiral_status
2180     Prev_sprl_stat=Spiral_status
2190     GOSUB Log_spirall
2200     RETURN
2210     !
2220     !
2230     !
2240     Check_data: !
2250     IF Pos>=Start_pos AND Pos<=Start_pos+9 THEN
2260        IF Fwt>16 AND Fwt<28 AND Bwt 16>AND Bwt<28 AND D(Pos,13)=0 AND D(Pos,14)=0 THEN
2270           D(Pos,13)=Fwt
2280           D(Pos,14)=Bwt
2290     !CALCULATE WINDER RUN TIME, WINDER DOFF
2300     !TIME AND FRONT AND BACK PACKAGE WEIGHT
2310     !IN POUNDS.
2320           Index=15
2330           IF D(Pos,12)=1 THEN Index=Index+1
2340           Run_time=D(Pos,Index)-D(Pos,Index+1)
2350           Doff_time=D(Pos,Index+1)-D(Pos,Index+2)
2360           IF Run_time<1200 THEN
2370              Run_time=D(Pos,Index+2)-D(Pos,Index+3)
2380              Doff_time=D(Pos,Index+3)-D(Pos,Index+4)
2390           END IF
2400           F_wt=D(Pos,13)
2410           B_wt=D(Pos,14)
2420           Comp_info=1 AND (Doff_time>.5) AND (Doff_time<1.E+8) AND (Run_time>1850) AND (Run_time<2200)
2430        END IF
2440     END IF
2450     RETURN
2460     !
2470     !
2480     !
2490     Clr_scrn_buff: !
2500     C$(1)="      "&DATE$(TIMEDATE)
2510     C$(2)="        "&TIME$(TIMEDATE)
2520     FOR J=3 TO 22
2530        C$(J)=""
2540     NEXT J
2550     C$(5)="       FIRST PACKAGE WEIGHED"
2560     C$(6)="         POSITION ___"
2570     C$(7)=""
```

```
2580    C$(8)="        WEIGHT    "
2590    C$(10)="       SECOND PACKAGE WEIGHED"
2600    C$(11)=C$(6)
2610    C$(12)=C$(7)
2620    C$(13)=C$(8)
2630    RETURN
2640    !
2650    !
2660    !
2670    Controller_scan: !
2680        FOR I=Start_pos TO Start_pos+9
2690            IF D(I,0)=1 THEN
2700                IF D(I,3)=1 THEN
2710                    CALL Euro_read_stpt(D(I,5),D(I,6),Euro_stpt,Eu-err)
2720                    IF Eu_err THEN CALL Euro_read_stpt(D(I,5),D(I,6),Euro_stpt,Eu-err)
2730                    GOSUB Euro_off_line
2740                    IF NOT Eu_err THEN
2750                        IF Stpt_change(I,2)=1 THEN
2760                            IF Stpt_change(I,3)=Euro_stpt THEN
2770                                Stpt_change(I,2)=0
2780                                Z$="EU "&VAL$(Euro_stpt)&"("&VAL$(INT(Euro_stpt-D(I,11)))&")M"
2790                                CALL Log_event(Rec,VAL$(I),Z$)
2800                                D(I,11)=Euro_stpt
2810                                !WITH A MANUAL ADJUSTMENT DISCARD OLD DATA FOR FAST RESPONSE
2820                                FOR J=21 TO 35
2830                                    D(I,J)=0
2840                                NEXT J
2850                            ELSE
2860                                Stpt_change(I,3)=Euro_stpt
2870                            END IF
2880                        ELSE
2890                            IF ABS(D(I,11)-Euro_stpt)>.05 THEN
2900                                Stpt_change(I,2)=1
2910                                Stpt_change(I,3)=Euro_stpt
2920                            END IF
2930                        END IF
2940                    END IF
2950                END IF
2960                IF D(I,7)=1 THEN
2970                    CALL Tt_read_stpt(D(I,9),Tt_stpt,Tt_err)
2980                    IF Tt_err THEN CALL Tt_read_stpt(D(I,9),Tt_stpt,Tt_err)
2990                    GOSUB Tt_off_line
3000                    IF NOT Tt_err THEN
3010                        IF Stpt_change(I,0)=1 THEN
3020                            IF Stpt_change(I,1)=Tt_stpt THEN
3030                                Stpt_change(I,0)=0
3040                                IF ABS(D(I,10)-Tt_stpt)>.1 THEN
3050                                    Z$="3T "&VAL$(Tt_stpt)&"("&VAL$(PROUND(Tt_stpt-D(I,10),-1))&")M"
3060                                    CALL Log_event(Rec,VAL$(I),Z$)
3070                                    D(I,10)=Tt_stpt
3080                                    !WITH MANUAL ADJUSTMENT DISCARD OLD DATA FOR FAST RESPONSE
3090                                    FOR J=21 TO 35
3100                                        D(I,J)=0
3110                                    NEXT J
3120                                END IF
3130                            ELSE
3140                                Stpt_change(I,1)=Tt_stpt
3150                            END IF
3160                        ELSE
3170                            IF ABS(D(I,10)-Tt_stpt)>.5 THEN
3180                                Stpt_change(I,0)=1
3190                                Stpt_change(I,1)=Tt_stpt
3200                            END IF
3210                        END IF
3220                    END IF
3230                END IF
3240            END IF
3250        NEXT I
3260    RETURN
3270    !
3280    !
3290    !
3300    Device: 1
```

```
3310    ON ERROR GOTO Dev1
3320    SELECT List_device
3330    CASE =1
3340       GOTO Dev2
3350       ASSIGN @Device TO *
3360       ASSIGN @Device TO PRT
3370       ON KEY 2 LABEL "PRINTER",1 GOSUB Device
3380       List_device=2
3390    CASE =2
3400    Dev2: !
3410       ASSIGN @Device TO *
3420       ON KEY 2 LABEL "DISC",1 GOSUB Device
3430       ASSIGN @Device TO "LOG";FORMAT ON
3440       List_device=0
3450    CASE =0
3460!!!!GOTO Dev2
3470       ASSIGN @Device TO *
3480       ASSIGN @Device TO 13
3490       ON KEY 2 LABEL "TERMINAL",1 GOSUB Device
3500       List_device=0
3510    END SELECT
3520    RETURN
3530    Dev1: !
3540    DISP ERRN,ERRM$
3550    OFF ERROR
3560    BEEP
3570    RETURN
3580    !
3590    !
3600    !
3610  Euro_off_line: !
3620    IF Eu_err AND NOT Eu_line(I) THEN
3630       Eu_line(I)=1
3640    CALL Log_event(Rec,VAL$(I),"EU OFF-LINE")
3650    END IF
3660    IF Eu_line(I) AND NOT Eu_err THEN
3670       Eu_line(I)=0
3680       CALL Log_event(Rec,VAL$(I),"EU ON-LINE")
3690    END IF
3700    RETURN
3710    !
3720    !
3730    !
3740  I1: !
3750    Dselect=1
3760    GOTO Ix
3770  I10: !
3780    Dselect=10
3790    GOTO Ix
3800  I100: !
3810    Dselect=100
3820    GOTO Ix
3830  I1000: !
3840    Dselect=1000
3850    GOTO Ix
3860  I10000: !
3870    Dselect=10000
3880    GOTO Ix
3890  I100000: !
3900    Dselect=100000
3910  Ix: !
3920    SELECT Ctr_slctr
3930    CASE =1
3940       IF Start_rec MOD (10*Dselect)<9*Dselect THEN
3950          Start_rec=Start_rec+Dselect
3960       ELSE
3970          Start_rec=Start_rec-9*Dselect
3980       END IF
3990       Ctr_slctr=0
4000    Case =0
4010       IF Stop_rec MOD (10*Dselect)<9*Dselect THEN
4020          Stop_rec=Stop_rec+Dselect
4030       ELSE
```

```
4040            Stop_rec=Stop_rec-9*Dselect
4050         END IF
4060         Ctr_slctr=1
4070      END SELECT
4080      GOSUB Start_stop
4090      RETURN
4100      !
4110      !
4120      !
4130 List_data: !
4140      ON ERROR GOTO Ld1
4150      IF Rollover=1 THEN
4160 !!!!Uplim=99840
4170         Uplim=200000
4180      ELSE
4190         Uplim=Rec
4200      END IF
4210      IF List_device=1 THEN
4220         Page=22
4230         Stop_rec=Start_rec+Page
4240      ELSE
4250         Page=1999
4260      END IF
4270      IF Start_rec<1 THEN Start_rec=1
4280      IF Start_rec>Uplim THEN Start_rec=Uplim
4290      IF Stop_rec<Start_rec THEN Stop_rec=Start_rec
4300      IF Stop_rec>Uplim THEN Stop_rec=Uplim
4310      IF Stop_rec-Start_rec>Page THEN Stop_rec=Start_rec+Page
4320      ASSIGN @File TO "LOG"
4330      ASSIGN @Buff TO BUFFER Y$
4340      ENTER @File,Start_rec
4350      TRANSFER @File TO @Buff;COUNT 52*(Stop_rec-Start_rec+1),CONT
4360      TRANSFER @Buff TO @Device;COUNT 52*(Stop_rec-Start_rec+1),CONT
4370      Start_rec=Start_rec+Page
4380      RETURN
4390 Ld1: !
4400      DISP ERRN,ERRM$
4410      BEEP
4420      OFF ERROR
4430      RETURN
4440      !
4450      !
4460      !
4470 Log_spiral:!
4480      Change=BINEOR(Spiral_status,Prev_sprl_stat)
4490      Log_sprial1: !
4500      Change_bit=INT(PROUND(LOG(Change)/LOG(2),-8))
4510      Position$=A$(Change_bit)
4520      IF Position$<>"0" THEN
4530         CALL Log_event(Rec,Position$,Ss$(BIT(Spiral_status,Change_bit)))
4540         Position=VAL(Position$)
4550         D(Position,12)=BIT(Spiral_status,Change_bit)
4560         FOR I=19 TO 15 STEP -1
4570            D(Position,I+1)=D(Position,I)
4580         NEXT I
4590         D(Position,15)=TIMEDATE
4600         IF D(Position,12)=0 THEN
4610            D(Position,13)=0
4620            D(Position,14)=0
4630         END IF
4640      END IF
4650      Change=PROUND(Change-2^(Change_bit),0)
4660      IF Change THEN GOTO Log_sprial1
4670      RETURN
4680      !
4690      !
4700      !
4710 Mean_b: !
4720      IF D(Pos,24)=0 THEN
4730         Mean=B(1,1)
4740      ELSE
4750         IF D(Pos,27)=0 THEN
4760            Mean=(B(1,1)+B(2,1))/2
4770         ELSE
```

```
4780            IF D(Pos,30)=0 THEN
4790              Mean=(B(1,1)+B(2,1)+B(3,1))/3
4800          ELSE
4810            IF D(Pos,33)=0 THEN
4820              Mean=(B(1,1)+B(2,1)+B(3,1)+B(4,1))/4
4830            ELSE
4840              FOR I=1 TO 4
4850                FOR J=4 TO I STEP -1
4860                  IF B(J,1)>B(J+1,1) THEN
4870                    X1=B(J,1)
4880                    X2=B(J,2)
4890                    B(J,1)=B(J+1,1)
4900                    B(J,2)=B(J+1,2)
4910                    B(J+1,1)=X1
4920                    B(J+1,2)=X2
4930                  END IF
4940                NEXT J
4950              NEXT I
4960              Mean=(B(2,1)+B(3,1)+B(4,1))/3
4970            END IF
4980          END IF
4990        END IF
5000      END IF
5010      RETURN
5020    !
5030    !
5040    !
5050    Print_screen: !
5060      FOR J=1 TO 23
5070        OUTPUT 11;C$(J)
5080      NEXT J
5090      RETURN
5100    !
5110    !
5120    !
5130    Scale: !
5140      SELECT Pkg_ctr
5150      CASE =0
5160        GOSUB Scale_scan
5170        IF NOT Scale_err AND NOT Scale_dyn AND Pos>=0 THEN
5180          GOSUB Clr_scrn_buff
5190          C$(23)=""
5200          IF Code$="F" THEN
5210            Fwt=Weight
5220            Codex$="FRONT"
5230          ELSE
5240            Bwt=Weight
5250            Codex$="BACK"
5260          END IF
5270          Wt1=Weight
5280          C$(6)="     POSITION "&VAL$(Pos)
5290          C$(7)="     "&Codex$
5300          C$(8)="     WEIGHT "&VAL$(Weight)
5310          Pkg_ctr=1
5320          IF Pos=0 THEN
5330            C$(23)=""
5340            GOSUB Clr_scrn_buff
5350            Pkg_ctr=0
5360          ELSE
5370            C$(23)="    UNWANTED DATA CAN BE REMOVED BY ENTERING POSITION 0 AND FRONT OR BACK."
5380          END IF
5390          GOSUB Print_screen
5400        END IF
5410      CASE=1
5420        GOSUB Scale_scan
5430        IF NOT Scale_err AND NOT Scale_dyn AND Pos>=0 THEN
5440          IF Code$="F" THEN
5450            Fwt=Weight
5460            Codex$="FRONT"
5470          ELSE
5480            Bwt=Weight
5490            Codex$="BACK"
```

```
5500            END IF
5510            Wt2=Weight
5520            C$(11)="      POSITION "&VAL$(Pos)
5530            C$(12)="      "&Codex$
5540            CR(13)="      WEIGHT "&VAL$(Weight)
5550            Pkg_ctr=2
5560            IF Pos=0 THEN
5570               C$(23)=""
5580               GOSUB Clr_scrn_buff
5590               GOSUB Print_SCREEN
5600               Pkg_ctr=0
5610            ELSE
5620               Data_ok=1
5630               IF C$(6)<>C$(11) THEN
5640                  C$(6)="***"&C$(6)[4]
5650                  C$(11)="***"&C$(11)[4]
5660                  C$(16)="    BOTH PACKAGES MUST BE FROM THE SAME POSITION."
5670                  Data_ok=0
5680               ELSE
5690                  C$(6)="   "&C$(6)[4]
5700                  C$(11)="   "&C$(11)[4]
5710                  C$(16)=""
5720               END IF
5730               IF C$(7)=C$(12) THEN
5740                  C$(7)="***"&C$(7)[4]
5750                  C$(12)="***"&C$(12)[4]
5760                  C$(16)="        THERE MUST BE A FRONT AND A BACK PACKAGE."
5770                  Data_ok=0
5780               ELSE
5790                  C$(7)="   "&C$(7)[4]
5800                  C$(12)="   "&C$(12)[4]
5810               END IF
5820               IF C$(6)<>C$(11) AND C$(7)=C$(12) THEN C$(16)="   THERE MUST BE A FRONT AND A BACK PACKAGE FROM THE SAME POSITION."
5830               IF NOT Data_ok THEN
5840                  C$(18)="    PLEASE WEIGH THE PACKAGE AGAIN WHICH IS CURRENTLY ON THE SCALE."
5850                  GOSUB Print_screen
5860                  FOR K=1 TO 3
5870                     OUTPUT 10;"DS"!BEEP 3X
5880                     WAIT .5
5890                  NEXT K
5900               ELSE
5910                  C$(23)="        PACKAGE WEIGHTS ACCEPTED"
5920                  Pkg_ctr=0
5930                  GOSUB Check_data
5940                  GOSUB Print_screen
5950               END IF
5960            END IF
5970         END IF
5980      CASE =2
5990         GOSUB Scale_scan
6000         IF NOT Scale_err AND Pos>=0 THEN
6010            IF Pos=0 THEN
6020               GOSUB Clr_scrn_buff
6030               C$(23)=""
6040            ELSE
6050               IF Code$="F" THEN
6060                  Codex$="FRONT"
6070               ELSE
6080                  Codex$="BACK"
6090               END IF
6100               C$(11)="      POSITION "&VAL&(Pos)
6110               C$(6)=C$(11)
6120               C$(12)="      "&Codex$
6130               IF Codex$="FRONT" THEN
6140                  C$(7)="      BACK"
6150                  Fwt=Wt2
6160                  Bwt=Wt1
6170               ELSE
6180                  C$(7)="      FRONT"
6190                  Fwt=Wt1
6200                  Bwt=Wt2
```

```
6210            END IF
6220            C$(16)=""
6230            C$(18)=""
6240            C$(23)="    PACKAGE WEIGHTS ACCEPTED"
6250            GOSUB Check_data
6260          END IF
6270          Pkg_ctr=0
6280          GOSUB Print_screen
6290        END IF
6300     END SELECT
6310     IF Comp_info=1 THEN
6320        FOR I=35 TO 26 STEP -3
6330           D(Pos,I)=D(Pos,I-3)
6340           D(Pos,I-1)=D(Pos,I-4)
6350           D(Pos,I-2)=D(Pos,I-5)
6360        NEXT I
6370        !ESTIMATE WET TUBE WEIGHT OF 0.6 LB
6380           D(Pos,21)=(F_wt-.6)*(1-D(Pos,37))*(1-D(Pos,38))*3600/Run_time
6390           D(Pos,22)=(B_wt-.6)*(1-D(Pos,37))*(1-D(Pos,38))*3600/Run_time
6400           IF D(Pos,12)=1 THEN
6410              D(Pos,23)=D(Pos,16)
6420           ELSE
6430              D(Pos,23)=D(Pos,15)
6440           END IF
6450        !IF DELTA FB >.45 LB THEN DISCARD OLD DATA FOR FAST RESPONSE.
6460           IF ABS(D(Pos,21)-D(Pos,22))>.45 THEN
6470              FOR I=24 to 35
6480                 D(Pos,I)=0
6490              NEXT I
6500           END IF
6510        !IF TWO CONSECUTIVE LB/HR >71.9 OR <70.5 THEN DISCARD OLD DATA FOR FAST
RESPONSE.
6520           Last_lb_hr=D(Pos,21)+D(Pos,22)
6530           SELECT Last_lb_hr
6540           CASE >71.9
6550              IF Last_hi(Pos)=1 THEN
6560                 FOR I=24 TO 35
6570                    D(Pos,I)=0
6580                 NEXT I
6590                 Last_hi(Pos)=0
6600              ELSE
6610                 Last_hi(Pos)=1
6620              END IF
6630           CASE 70.5
6640              IF Last_lo(Pos)=1 THEN
6650                 FOR I=24 TO 35
6660                    D(Pos,I)=0
6670                 NEXT I
6680                 Last_lo(Pos)=0
6690              ELSE
6700                 Last_lo(Pos)=1
6710              END IF
6720           CASE ELSE
6730              Last_hi(Pos)=0
6740              Last-lo(Pos)=0
6750           END SELECT
6760        !ADJUST TARGET LB/HR FOR DEVIATION FROM SPEC
6770           Kfilter=.25
6780           Tot_lb_hr1=(1-Kfilter)*Tot_lb_hr1+Kfilter*Last_lb_hr
6790           Tot_lb_hr2=(1-Kfilter)*Tot_lb_hr2+Kfilter*Tot_lb_hr1
6800           Tot_lb_hr3=(1-Kfilter)*Tot_lb_hr3+KFilter*Tot_lb_hr2
6810           Lb_hr_target=Lb_hr_target+Lb+hr_spec-Tot_lb_hr3
6811           IF Lb_hr_target>71.9 THEN Lb_hr_target=71.9
6812           IF Lb_hr_target<70.5 THEN Lb_hr_target=70.5
6814           D(Pos,36)=Lb_hr_target
6820           IF D(Pos,0)=1 AND D(Pos,3)=1 THEN
6830        !CALCULATE DELTA SETPOINT FOR A EUROTHERM CONTROLLER (DEGF).
6840        !BUSHING SENSITIVITY OF 0.8%/DEGF IS USED.
6850        !LB/HR IS CALCULATED AS TRIM MEAN OF LAST FIVE VALUES.
6860        !DELTA SETPOINT IS LIMITED TO 5 DEGF.
6870        !
6880        !CALCULATE LAST 5 LB/HR VALUES
6890           FOR I=21 TO 33 STEP 3
```

```
6900            B((I-21)/3+1,1)=D(Pos,I)+D(Pos,I+1)
6910            B((I-21)/3+1,2)=D(Pos,I+2)
6920         NEXT I
6930      !CALCULATE MEAN LB/HR
6940         GOSUB Mean_b
6950         Lb_hr=Mean
6960      !CONTROL AT 0.8%/degF
6970         D+euro_stpt=PROUND((D(Pos,36)-Lb_hr)/(D(Pos,36)*.008),0)
6980      !LIMIT ADJUSTMENT TO 5 degF
6990         IF D_euro_stpt>5 THEN D_euro_stpt=5
7000         IF D_euro_stpt<-5 THEN D_euro_stpt=-5
7010         Z$="EU"&VAL$(PROUND(D(Pos,11)+D_euro_stpt,0))&"("&VAL$(D_euro_stpt)&")"
7020         IF D(Pos,4)=1 THEN
7030            D(Pos,11)=PROUND(D(Pos,11)+D_euro_stpt,0)
7040            CALL Euro_set_stpt(D(Pos,5),D(Pos,6),D(Pos,11),Eu_err)
7050            IF Eu_err THEN CALL Euro_set_stpt(D(Pos,5),D(Pos,6),D(Pos,11),Eu_err)
7060            I=Pos
7070            GOSUB Euro_off_line
7080            IF NOT Eu_err THEN
7090               F_lb_hr=(PROUND(D_euro_stpt,0))*.008+1
7100               FOR I=21 TO 33 STEP 3
7110                  D(Pos,I)=D(Pos,I)*F_lb_hr
7120                  D(Pos,I+1)=D(Pos,I+1)*F_lb_hr
7130               NEXT I
7140            END IF
7150         ELSE
7160            Z$=Z$&"P"
7170         END IF
7180         CALL Log_event(Rec,VAL$(Pos),Z$)
7190      END IF
7200      IF D(Pos,0)=1 AND D(Pos,7)=1 THEN
7210      !CALCULATE DELTA SETPOINT FOR A THREE-TERMINAL CONTROLLER (AMPS).
7220      !BUSHING SENSITIVITY OF .07 LB/A FOR FRONT TO BACK WET PACKAGE
7230      !WEIGHT DIFFERENCES FOR CALLDOWN PACKAGES (1930 SECONDS).
7240      !CONVERSION FACTOR = CDtime/(3600*(1-H20)*(1-LOI)*.07) = 8.55 A-HR/LB.
7250      !
7260      !CALCULATE LAST 5 LB/HR DIFFERENCES
7270         FOR I=21 TO 33 STEP 3
7280            B((I-21)/3+1,1)=D(Pos,I)-D(Pos,I+1)
7290            B((I-21)/3+1,2)=D(Pos,I+2)
7300         NEXT I
7310      !CALCULATE MEAN FRONT-BACK LB/HR
7320         GOSUB Mean_b
7330         D_lb_hr=Mean
7340         A_hr_lb=D(Pos,40)/(3600*(1-D(Pos,37))*(1-D(Pos,38))*D(Pos,39))
7350         D_tt_stpt=PROUND(D_lb_hr*A_hr_lb,-1)
7360         Tt_stpt_new=PROUND(D(Pos,10)+D_tt_stpt,-1)
7370         IF Tt_stpt_new>Imax THEN Tt_stpt_new=Imax
7380         IF Tt_stpt_new<-Imax THEN Tt_stpt_new=-Imax
7390         D_tt_stpt=PROUND(Tt_stpt_new-D(Pos,10),-1)
7400         Z$="3T"&VAL$(Tt_stpt_new)&"("&VAL$(D_tt_stpt)&")"
7410         IF D(Pos,8)=1 THEN
7420            D(Pos,10)=Tt_stpt_new
7430            CALL Tt_set_stpt(D(Pos,9),D(Pos,10),Tt_err)
7440            IF Tt_err THEN CALL Tt_set_stpt(D(Pos,9),D(Pos,10),Tt_err)
7450            I=Pos
7460            GOSUB Tt_off_line
7470            IF NOT Tt_err THEN
7480               D_lb_hr=D_tt_stpt/(2*A_hr_lb)
7490               FOR I=21 TO 33 STEP 3
7500                  IF D(Pos,I)>0 THEN
7510                     D(Pos,I)=D(Pos,I)-D_lb_hr
7520                     D(Pos,I+1)=D(Pos,I+1)+D_lb_hr
7530                  END IF
7540               NEXT I
7550            END IF
7560         ELSE
7570            Z$=Z$&"P"
7580         END IF
7590         CALL Log_event(Rec,VAL$(Pos),Z$)
7600         IF Tt_stpt_new=Imax OR Tt_stpt_new=-Imax THEN
7610!!!!!!!!!!ASSIGN @Term TO 11 !DISPLAY OPERATOR ALERT AS SCALE TERMINAL
```

```
7620          ASSIGN @Term TO 13    !DISPLAY OPERATOR ALERT AT COMPUTER TERMINAL
7630          FOR I=1 TO 5
7640             OUTPUT @Term;""
7650          NEXT I
7660          OUTPUT @Term;TIME$(TIMEDATE),DATE$(TIMEDATE)
7670          OUTPUT @Term;""
7680          OUTPUT @Term;"TANK 509, POSITION ";Pos;" NEEDS A FIN COOLER ADJUSTMENT."
7690          OUTPUT @Term;""
7700          IF Tt_stpt_new>0 THEN
7710             Z$="LEFT"
7720          ELSE
7730             Z$="RIGHT"
7740          END IF
7750          OUTPUT @Term;"THE "&Z$&" SIDE OF THE BUSHING IS HOT."
7760          OUTPUT @Term;""
7770          OUTPUT @Term;"RESET THE THREE-TERMINAL CONTROLLER TO ZERO USING THE
FOLLOWING PROCEDURE:"
7780          OUTPUT @Term;"   1.  SET THE SWITCH TO 'MAN' (DOWN POSITION)."
7790          OUTPUT @Term;"   2.  ADJUST THE KNOB FOR ZERO ON THE METER."
7800!!!!!!!!!OUTPUT @Term;"   3.  WAIT 30 SECONDS."
7810          OUTPUT @Term;"   3.  WAIT FOR THE COMPUTER TO ACKNOWLEDGE THE ADJUST
MENT (10-30 SECONDS)."
7820          OUTPUT @Term;"   4.  SET THE SWITCH TO 'AUTO' (UP POSITION)."
7830!!!!!!!!!OUTPUT @Term;"   5.  ADJUST THE FIN COOLERS."
7840          OUTPUT @Term;"   5.  CALL THE FIXER FOR FIN ADJUSTMENT."
7850          FOR I=1 TO 8
7860             OUTPUT @Term;""
7870          NEXT I
7880          END IF
7890       END IF
7900       Comp_info=0
7910    END IF
7920    RETURN
7930    !
7940    !
7950    !
7960    Scale_off_line: !
7970    IF Scale_err AND NOT Scale_line THEN
7980       Scale_line=1
7990       CALL Log_event(Rec,"","SCALE OFF-LINE")
8000    END IF
8010    IF Scale_line AND NOT Scale_err THEN
8020       Scale_line=0
8030       CALL Log_event(Rec,"","SCALE ON-LINE")
8040    END IF
8050    RETURN
8060    !
8070    !
8080    !
8090    Scale_scan: !
8100    CALL Scale_read(Pos,Code$,Weight,Scale_err,Scale_dyn)
8110    IF Scale_err THEN CALL Scale_read(Pos,Code$,Weight,Scale_err,Scale_dyn)
8120    GOSUB Scale_off_line
8130    IF NOT (Pos=-1 OR Scale_dyn OR Scale_err) THEN
8140       CALL Log_event(Rec,VAL$(Pos),Code$[1;1]&VAL$(Weight))
8150    END IF
8160    RETURN
8170    !
8180    !
8190    !
8200    Spiral_scan: !
8210!!STATUS 12,3;Spiral_status
8220    GOSUB Spiral_update
8230    IF Spiral_status<>Prev_sprl_stat THEN
8240       GOSUB Log_spiral
8250       Prev_sprl_stat=Spiral_status
8260    END IF
8270    RETURN
8280    !
8290    !
8300    !
8310    Spiral_update: !
8320       ON TIMEOUT 8,10 GOTO Su3
8330       ON ERROR GOTO Su2
```

```
8340    Su1: !
8350       OUTPUT 8 USING "#,A";CHR$(13)      !XMT CARRIAGE RETURN
8360       ENTER @Port;Proc$
8370       IF Proc$[1,5]<>CHR$(32)&CHR$(32)&CHR$(32)&CHR$(20)&CHR$(32) OR LEN(Proc$)>
<10 THEN GOTO Su1
8380       Lo=BINAND(NUM(Proc$[7]),31)
8390       Hi=BINAND(NUM(Proc$[6]),31)
8400       Spiral_status=Lo+32*Hi
8410       IF Time_date_req=1 THEN
8420          OUTPUT 8 USING "#,A";"T"
8430          ENTER @Port USING"#,A";Td$
8440          OUTPUT 8 USING "#,A";CHR$(13)
8450          ENTER @Port;Td$
8460          Dd$=Td$[9,10]&" "&Mon$(VAL(Td$[6,7]))&" 19"&Td$[12,13]
8470          Tt$=Td$[15,22]
8480          SET TIMEDATE DATE(Dd$)+TIME(Tt$)
8490          PRINT TIME$(TIMEDATE),DATE$(TIMEDATE)
8500          Time_date_req=0
8510       END IF
8520       IF Sprl_line=1 THEN
8530          CALL Log_event(Rec,"","PROCESS COMPUTER ON-LINE")
8540          Sprl_line=0
8550       END IF
8560       OFF TIMEOUT 8
8570       OFF ERROR
8580       RETURN
8590    Su3: !
8600       IF Sprl_line=0 THEN
8610          CALL Log_event(Rec,"","PROCESS COMPUTER OFF-LINE")
8620          Sprl_line=1
8630       ELSE
8640          PRINT "THE PROCESS COMPUTER IS NOT RESPONDING."
8650       END IF
8660    Su2: !
8670       STATUS 8,10;Uart_stat
8680       GOTO Su1
8690    !
8700    !
8710    !
8720    Start_stop: !
8730       SELECT Ctr_slctr
8740       CASE =1
8750          Ctr_slctr=0
8760          ON KEY 3 LABEL "STOP   "&VAL$(Stop_rec),1 GOSUB Start-stop
8770       CASE =0
8780          Ctr_slctr=1
8790          ON KEY 3 LABEL "START "&VAL$(Start_rec),1 GOSUB Start_stop
8800       END SELECT
8810       RETURN
8820    !
8830    !
8840    !
8850    Store_data: !
8860       IF Store_flag THEN RETURN
8870       Store_flag=1
8880       ON ERROR GOTO Store_data3
8890       PURGE "DATA"
8900    Store_data: !
8910       CREATE BDAT "DATA",15
8920       ASSIGN @P1 TO "DATA"
8930       OUTPUT @P1;D(*),Rec
8940       ASSIGN @P1 TO *
8950    Store_data2: !
8960       Last_update=TIMEDATE
8970       OFF ERROR
8980       Store_flag=0
8990       CALL Log_event(Rec,"","DATA STORE")
9000       RETURN
9010    Store_data3: !
9020       IF ERRN=56 THEN
9030          GOTO Store_data1
9040       ELSE
9050          GOTO Store_data2
```

```
9060        END IF
9070        !
9080        !
9090        !
9100    Tt_off_line: !
9110        IF Tt_err AND NOT Tt_line(I) THEN
9120            Tt_line(I)=1
9130            CALL Log_event(Rec,VAL$(I),"3T OFF-LINE")
9140        END IF
9150        IF Tt_line(I) AND NOT Tt_err THEN
9160            Tt_line(I)=0
9170            CALL Log_event(Rec,VAL$(I),"3T ON-LINE")
9180        END IF
9190        RETURN
9200        !
9210        !
9220        !
9230        END
9240        !
9250        !
9260        !
9270        SUB Euro_read_stpt(Gid,Uid,Stpt,INTEGER Euro_err)
9280            COM /Io/ @File,@Buff,@Device,Y$[32000] BUFFER
9290            Conversion$=CHR$(3)&CHR$(10)
9300            ASSIGN @Ctlr TO 9;CONVERT IN BY PAIRS Conversion$
9310            Cmd$=CHR$(4)&VAL$(Gid)&VAL$(Gid)&VAL$(Uid)&VAL$(Uid)&CHR$(83)&CHR$(76)&C
HR$(5)
9320            ON ERROR GOTO Error
9330            ON TIMEOUT 9,.1 GOTO Error
9340            STATUS 9,10;Uart_stat!CLEAR UART STATUS REGISTER
9350            OUTPUT 9 USING "8A,#";Cmd$
9360            ENTER @Ctlr;Response$
9370            Response$=Response$&CHR$(3)
9380            ENTER 9 USING "A,#";Bcc$
9390            Stpt=VAL(Response$[4,8])
9400            Bcc=NUM(Bcc$)
9410            Sub_bcc=0
9420            FOR I=2 TO 9
9430                Sub_bcc=BINEOR(Sub_bcc,NUM(Response$[I]))
9440            NEXT I
9450            IF Sub_bcc=Bcc THEN
9460                Euro_err=0
9470            ELSE
9480                Euro_err=1
9490            END IF
9500            GOTO Subend
9510    Error:  !
9520            Euro_err=1
9530    Subend: !
9540            ASSIGN @Ctlr TO *
9550            OFF TIMEOUT 9
9560            OFF ERROR
9570        SUBEND
9580        !
9590        !
9600        !
9610        !********* SUBPROGRAM EURO_SET_STPT ********
9620        !LWJ 8-9-85
9630        !THIS SUBPROGRAM ACCEPTS AS INPUT VARIABLES
9640        !Gid (GROUP ADDRESS), Uid (UNIT ADDRESS) AND
9650        !Stpt (SETPOINT) THEN RETURNS Euro_err
9660        !(TRANS. ERROR). Euro_err IS SET TO 1 ON
9670        !TRANS. ERROR. OTHERWISE IT IS SET TO 0.
9680        !THE DATALINK IS AN HP98626A RS-232
9690        !INTERFACE AT SELECT CODE 9.
9700        SUB Euro_set_stpt(Gid,Uid,Stpt,INTEGER Euro_err)
9710            COM /Io/ @File,@Buff,@Device,Y$[32000]BUFFER
9720            Sub_cmd$=CHR$(4)&VAL$(Gid)&VAL$(Gid)&VAL$(Uid)&VAL$(Uid)&CHR$(2)
9730            Stpt=PROUND(Stpt,0)
9740            Data$=VAL$(Stpt)
9750            IF Stpt<1000 AND Stpt>99 THEN Data$="0"&VAL$(Stpt)
9760            IF Stpt<100 AND Stpt>9 THEN Data$="00"&VAL$(Stpt)
9770            IF Stpt<10 AND Stpt>0 THEN Data$="000"&VAL$(Stpt)
9780            Com$=CHR$(83)&CHR$(76)&Data$&CHR$(46)&CHR$(3)
```

```
9790            Bcc=0
9800            FOR I=1 TO 8
9810               Bcc=BINEOR(Bcc,NUM(Com$[I]))
9820            NEXT I
9830            Cmd$=Sub_cmd$&Com$&CHR$(Bcc)
9840            ON ERROR GOTO Error
9850            ON TIMEOUT 9,.1 GOTO Error
9860            STATUS 9,10;Uart_stat!CLEAR UART STATUS REGISTER
9870            OUTPUT 9 USING "15A,#";Cmd$
9880            ENTER 9 USING "1A,#";Response$
9890            IF Response$=CHR$(6) THEN !(ACK)
9900               Euro_err=0
9910            ELSE
9920               Euro_err=1
9930            END IF
9940            GOTO Subend
9950        Error:   !
9960            Euro_err=1
9970        Subend:
9980           OFF TIMEOUT 9
9990           OFF ERROR
10000       SUBEND
10010       !
10020       !
10030       !
10040       SUB Log_event(Rec,Pos$,Event_code$)
10050          COM /Io/ @File,@Buff,@Device,Y$[32000] BUFFER
10060          Rec=PROUND(Rec+1,0)
10070          ALLOCATE Z$[80]
10080          IF LEN(Pos$)>3 THEN Pos$=Pos$[1,3]
10090          !GENERATE 50 CHARACTER MESSAGE STRING
10100          Z$=VAL$(Rec)&RPT$(" ",8-LEN(VAL$(Rec)))&Pos$&RPT$(" ",3-LEN(Post$))&Event
_code$&RPT$(" ",18-LEN(Event_code$))&TIME$(TIMEDATE)&" "&DATE$(TIMEDATE)
10110          ASSIGN @Log TO "LOG";FORMAT ON
10120          OUTPUT @Log,Rec;Z$
10130          ASSIGN @Log TO *
10140          PRINT Z$
10150          ON ERROR GOTO Le1
10160          ON TIMEOUT 7,.5 GOTO Le1
10170          OUTPUT 701;Z$
10180       Le1:   !
10190          OFF ERROR
10200          OFF TIMEOUT 7
10210          DEALLOCATE Z$
10220!!!IF Rec=99840 THEN
10230          IF Rec=200000 THEN
10240              Rec=0
10250              Rollover=1
10260          END IF
10270       SUBEND
10280       !
10290       !
10300       !
10310       SUB Scale_init(INTEGER Scale_err)
10320          Scale_err=0
10330          STATUS 10,10;Uart_stat!CLEAR UART STATUS REGISTER
10340          OUTPUT 10 USING "A,#";CHR$(6)      !SEND ACK TO SCALE TO ESTABLISH HANDSHAKE
10350          ON ERROR GOTO Scale_err
10360          ON TIMEOUT 10,.25 GOTO Init1
10370          ENTER 10;Response$
10380       Init1:
10390          OUTPUT 10;"SI"     !REQUEST WEIGHT IMMEDIATE
10400          ON TIMEOUT 10,.25 GOTO Init2
10410          ENTER 10;Response$
10420       Init2:
10430          OUTPUT 10;"SI"     !REQUEST WEIGHT IMMEDIATE
10440          OUTPUT 10 USING "A,#";CHR$(6)      !SEND ACK TO SCALE
10450          ON TIMEOUT 10,.25 GOTO Scale_err
10460          ENTER 10;Response$
10470          IF Response$[1;1]="S" THEN GOTO Sub_end
10480       Scale_err;
10490          Scale_err=1
10500       Sub_end:
10510          OFF TIMEOUT 10
```

```
10520    OFF ERROR
10530 SUBEND
10540 !
10550 !
10560 !
10570 !SUBPROGRAM SCALE_READ
10580 !THIS SUBROUTINE READS A SAUTER MULTISCALE
10590 !AND RETURNS FORMING POSITION (1-127) AND FRONT OR BACK PKG
10600 !FROM OPERATOR INPUT AND THE WEIGHT IN POUNDS.
10610 !POSITION IS RETURNED 0 IF THE WEIGHING ROUTINE
10620 !IS TO BE RESTARTED.
10630 !POSITION IS RETURNED -1 IF NO OPERATOR INPUT.
10640 !SCALE_ERR RETURNS A 1 IF SCALE COMMUNICATION
10650 !CANNOT BE ESTABLISHED.
10660 !THE SCALE BEEPS 2X WHEN A WEIGHT IS MEASURED.
10670 !THE DATA LINK IS A HP 98626A RS-232
10680 !INTERFACE AT SELECT CODE 10.
10690 SUB Scale_read(INTEGER Position,Code$,Weight,INTEGER Scale_err,Scale_dyn)
10700    COM /Io/ @File,@Buff,@Device,Y$[32000] BUFFER
10710    ON ERROR GOTO Io_error
10720    ON TIMEOUT 10,5 GOTO Error
10730    STATUS 10,10;Uart_stat!CLEAR UART STATUS REGISTER
10740    OUTPUT 10;"SI"
10750    OUTPUT 10 USING "A#";CHR$(6)     !SEND ACK TO SCALE FOR HANDSHAKE
10760    ENTER 10;Response$
10770    IF Scale_dyn=1 THEN GOTO Movement
10780    Position=-1
10790    IF Response$[1,2]<>"CA" THEN GOTO Sub_end     ! CHECK FOR OPERATOR INPUT
10800    IF Response$[4;1]="a" THEN
10810       Code$="F"!FRONT PKG
10820    ELSE
10830       Code$="B"!BACK PKG
10840    END IF
10850    Position=INT(VAL(Response$[6,12]))
10860    OUTPUT 10 USING "A#";CHR$(6)     !SEND ACK TO SCALE FOR HANDSHAKE
10870    ENTER 10;Response$
10880 Movement:   !
10890    IF Response$[1,2]<>"SD" THEN GOTO Scale_stable
10900    Scale_err=0
10910    Scale_dyn=1
10920    GOTO Sub_end
10930 Scale_stable:   !
10940    IF Response$[1,2]<>"S " THEN GOTO Error
10950    Weight=VAL(Response$[4,11])
10960    IF Response$[13,14]="kg" THEN Weight=Weight*2.205
10970    Scale_dyn=0
10980    Scale_err=0
10990    OUTPUT 10;"DS"
11000    WAIT .5
11010    OUTPUT 10;"DS"
11020    GOTO Sub_end
11030 Io_error:  !
11040    STATUS 10,10;Uart_stat
11050 Error:     !
11060    Scale_err=1
11070 Sub_end:!
11080    OFF TIMEOUT 10
11090    OFF ERROR
11100 SUBEND
11110 !
11120 !
11130 !
11140 !SUBROUTINE TT_READ_STPT
11150 !THIS SUBROUTINE ACCEPTS AS AN INPUT
11160 !VARIABLE THREE_TERM_ID
11170 !AND RETURNS VARIABLES THREE_TERM_STPT
11180 !AND THREE_TERM_ERR.
11190 !THREE_TERM_STPT IS CONVERTED FROM
11200 !ARBITRARY UNITS (0-255) TO
11210 !AMPERES (-36 to +36).
11220 !THREE_TERM_ID IS ASSUMED TO BE AN
11230 !INTEGER BETWEEN 0 AND 255.
11240 !THREE_TERM_ERR IS SET TO 1 IF THE THREE
```

```
11250 !TERMINAL CONTROLLER DOES NOT RESPOND
11260 !CORRECTLY.
11270 SUB Tt_read_stpt(Three_term_id,Three_term_stpt,INTEGER Three_term-err)
11280   COM /Io/ @File,@Buff,@Device,Y$[32000] BUFFER
11290   ON ERROR GOTO Error
11300   Id$=DVAL$(Three_term_id,16)
11310   Cmd$=CHR$(4)&Id$[7,8]&CHR$(5)
11320   ON TIMEOUT 9,.1 GOTO Error
11330   Conversion$=CHR(3)&CHR$(10)
11340   ASSIGN @Ctlr TO 9;CONVERT IN BY PAIRS Conversion$
11350   STATUS 9,10;Uart_stat!CLEAR UART STATUS REGISTER
11360   OUTPUT 9 USING "4A,#";Cmd$
11370   ENTER @Ctlr;Response$
11380   IF Response$[1;1]=CHR$(2) AND LEN(Response$)=3 THEN
11390     Three_term_err=0
11400!!!!!Three_term_stpt=PROUND((DVAL(Response$[2,3],16))/1.765-72,-1)
11410     Three_term_stpt=PROUND((DVAL(Response$[2,3],16))/3.53-36,-1)
11420   ELSE
11430     Three_term_err=1
11440   END IF
11450   GOTO Subend
11460 Error:!
11470   Three_term_err=1
11480 Subend:!
11490   ASSIGN @Ctlr TO *
11500   OFF TIMEOUT 9
11510   OFF ERROR
11520 SUBEND
11530 !
11540 !
11550 !
11560 !SUBROUTINE TT_SET_STPT
11570 !THIS SUBROUTINE ACCEPTS AS INPUT VARIABLES THREE_TERM_ID AND
11580 !THREE_TERM_STPT AND RETURNS VARIABLE THREE_TERM_ERR.
11590 !THREE_TERM_STPT IS CONVERTED FROM AMPERES (-36 TO +36)
11600 !TO ARBITRARY UNITS (0-255) FOR
11610 !THE INTERFACE CIRCUIT. THE CONVERSION FACTOR IS CALCULATED
11620 !(255 BITS/12.04 V)/(6 A/V)=3.53  (1.765 POS2)
11630 !THREE_TERM_ID AND THE CONVERTED THREE_TERM_STPT ARE ASSUMED TO BE
11640 !INTEGERS BETWEEN 0 AND 255.
11650 !IF NOT, THEY ARE ROUNDED TO THE NEAREST INTEGER VALUE AND
11660 !IF LESS THAN 0, SET TO 0 AND IF GREATER THAN 255, SET TO 255.
11670 !THREE_TERM_ERR RETURNS A 1 IF THE THREE-TERMINAL CONTROLLER DOES NOT
11680 !RESPOND WITH AN ACK. OTHERWISE A 0 IS RETURNED.
11690 !THE DATALINK IS AN HP98626A RS-232
11700 !INTERFACE AT SELECT CODE 9.
11710 SUB Tt_set_stpt(Three_term_id,Three_term_stpt,INTEGER Three_term_err)
11720   COM /Io/ @File,@Buff,@Device,Y$[32000] BUFFER
11730   ON ERROR GOTO Io_error
11740!!!Stpt=(Three_term_stpt+72)*1.765
11750   Stpt=(Three_term_stpt+36)*3.53
11760   Id$=DVAL$(Three_term_id,16)
11770   Stpt$=DVAL$(Stpt,16)
11780   Cmd$=CHR$(4)&Id${7,8]&CHR$(2)&Stpt$[7,8]&CHR$(3)
11790   ON TIMEOUT 9,.1 GOSUB Error
11800   STATUS 9,10;Uart_stat!CLEAR UART STATUS REGISTER
11810   OUTPUT 9 USING "7A,#";Cmd$
11820   ENTER 9 USING "A,#";Response$
11830   IF Response$[1;1]=CHR$(6) THEN
11840     Three_term_err=0
11850   ELSE
11860     Three_term_err=1
11870   END IF
11880   GOTO Subend
11890 Error:      !
11900   Three_term_err=1
11910   RETURN
11920 Io_error:!
11930   STATUS 9,10;Uart_err
11940   GOSUB Error
11950 Subend:!
11960   OFF TIMEOUT 9
```

```
11970  OFF ERROR
11980  SUBEND
11990  !
12000  !
12010  !
```

In the aforementioned program the fibers produced are of a fiber diameter of G. They are produced in two strands of G75 where the fibers have a starch oil aqueous chemical treatment. The adjustment to the main bushing controller occurs if there is a difference greater than one half the minimum resolution of the controller set point value which is around 0.4%.

Also in the preferred embodiment with the means and method of the aforementioned program, the interface between the programmed computer and the main housing controller is present in the main bushing controller which is a Turnbull control system (Eurotherm) controller.

In the aforementioned program lines 1–1050 perform functions of scanning the scale and if a package is present, reading the scale, scanning the spiral run for condition of run or stop, and scanning to see if any manual adjustment has been made to the controller and setting up initial calculations. Lines 1070–2200 configure the data array. Lines 5130–6300 reads a scale for weighing of the package. Lines 6310–7190 calculate the adjustment for the Eurotherm controller and lines 7200–7920 adjust the three-terminal bushing controller. Lines 8200–8270 and 8310–8680 scan the spiral for spiral status and enable storage for recording of time of attenuation according to the spiral in lines 4470–4670 of the program. The averaging of the values according to a running trimmed mean calculation is in lines 4710–5010 which is called by the subprogram for the eurotherm controller and the three-terminal bushing controller. Program lines 2670–3260 control the scanning of any manual adjustments and lines 9610–11980 are device driver routines.

Figure 4:
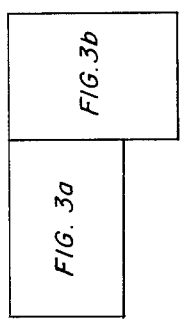
FIG. 4 is a diagram illustrating the relationship between FIGS. 3a, 3b and 3c.

The interface circuit between the program computer and the three-terminal bushing controller can be any interface circuit for a computer interface to a controller, but preferably the interface is as shown in FIGS. 3a, 3b and 3c. The attachment of these figures is shown in FIG. 4.

In FIG. 3a integrated circuit 128 translates an RS422 digital communications link supplied via leads 124 and 125 to integrated circuit 128. The conversion is to transistor transistor logic (TTL) level signals. Integrated circuit 128 can be any IC circuit known to those skilled in the art for such translation such as receiver, MC3486P. The output of integrated circuit 128 passes by leads 133 and 137 to integrated circuit 139. Integrated circuits 131 and 135 supply TTL level signals to integrated circuit 127 via leads 130 and 129 for integrated circuit 131 and via leads 136 and 133 for integrated circuit 135. Integrated circuit 127 translates the TTL level signals to an RS422 digital communication link via leads 122 and 123 as transmission leads to the programmed computer. Integrated circuits 131, 135 and 139 insulate the communication link from the rest of the interface card to eliminate any grounding problems.

The output from integrated circuit 139 is fed to a microcomputer 143 via lead 146. The input to integrated circuit 131 is fed from microcomputer 143 via lead 144. The input to integrated circuit 135 is fed from microcomputer 143 via lead 145. Microcomputer 143 has address switches in area 147 and band rate select switches in area 148. Any microcomputer chip known to those skilled in art can be used such as an Intel D8748. Output from microcomputer 143 via setting circuit 149 conveys signals to the analog to digital converter, integrated circuit 150 in FIG. 3b. This integrated circuit chip can be any digital to analog converter known to those skilled in the art like an AD558JN. The integrated circuit 150 converts the digital set point value to an analog voltage and conveys it as output to driver circuitry section indicated by the dotted line around the circuit and labeled 151. Lead 152 and 153 enter the microcomputer 143 from a comparator circuit section shown on FIG. 3b. Clock means 154 is a crystal to provide a clock function to the microcomputer and any crystal known to those skilled in the art to act as a clock function can be used such as a 6 megahertz micronium crystal No. MPQC-18-06000. Leads from the microcomputer 155 through 159 are for appropriate grounding.

The program in the microcomputer enables the microcomputer to scan the input received via leads 124 and 125 which are double leads. Lead 126 is a ground and lead 132 provides a DC voltage. The program enables the microcomputer to see any change in voltage on the input leads for the arrival of a signal. The program also enables the microcomputer to interpret a string of high and low voltages for the signal and to check to see if the incoming signal corresponds to an address switch and checks to see if the microcomputer is asked to read or set the set point for the three-terminal bushing controller (not shown in FIG. 3). If the signal requests the setting of a set point, the digital output from 143 is conveyed through output circuit 149.

In FIG. 3b the driver section 151 amplifies the analog voltage from the digital to analog converter 150. Amplification is from lead 161 where the signal on lead 161 passes through a protection resistor to transistors 164, 165, 167 and 168, the junctions of which are tied together by lead 169 with capacitor 170. Current protection is provided for transistors 167 and 168 by their associated diodes and resistors. The amplified output travels along lead 171 to the three-terminal bushing controller. The output is fed both to integrated circuit 150 via lead 173, potentiometer 172 and level 162 as feedback to determine the level of amplification. Lead 174 indicates the common circuit attachment. Comparator 175 assists in allowing measurement of the three-terminal controller set point when the controller is in the manual mode of operation via signal from the three-terminal bushing controller on lead 176 through protection resistor 177. The resistor 178 and capacitor 179 have selected values to enable the comparator to ramp up if the three-terminal bushing is in the manual mode for setting the output to zero volts. The comparator ramps up until a transition occurs from the output of the comparator compared to the output of the A to D converter that corresponds to the manual set point on the potentiometer 102 on FIG. 2. The comparator output is transmitted to the microcomputer by lead 152 and the manual or automatic mode switch of the control panel of the three-terminal bushing controller is transmitted to the microcomputer 143 by lead 153.

FIG. 3c shows the power supply circuitry for the interface circuit. Leads 181 and 182, which are each double leads, carry an AC voltage to transformer 183 which is connected to diode bridge integrated circuit 184. The output from the diode bridge is transmitted by lead 185 which is grounded on lead 186 through capacitor 187 and is transmitted to integrated circuit 188 to provide 15 volts of DC voltage. Integrated circuit 188 is a voltage regulator and the 15 volts is supplied by lead 189. Lead 190 takes voltage from voltage regulator 188, passes it through voltage regulator 191 to provide 5 volts DC on lead 192. Lead 189 is connected to lead 193 of FIG. 3b to provide 15 volts DC to the driver circuitry and to lead 194 of the comparator in FIG. 3b to provided 15 DC volts bias. Five volts are supplied from the power circuit by lead 192 to lead 195 for microcomputer 143 and leads 196, 197 and 198 for isolating integrated circuits 131, 135 and 139.

EXAMPLE

For a one-week period forming packages of glass fiber strands were weighed and reported to the improved automated bushing control system of the preferred embodiment for ten separate bushings. The coefficient of variation of package weights by the preferred embodiment control system was 0.776 percent compared to 0.939 percent without the improvement. This is a 17 percent reduction in package weight variation and represents improved set point control of the main bushing temperature controller and segment bushing controller. The COV value was obtained from a range, and since COV is not a linear function, any one of many process parameters may deviate from its nominal value and raise the COV while all parameters must be close to their nominal values to maintain a low COV.

In the preferred embodiment the scale that is used as a sautere 2180 multiscale with a resolution of 0.0005 pounds. The three-terminal controller interfaces an 8-bit digital/analog converter with a resolution of 0.047 volts at 6 amperes/volts.

We claim:

1. In an apparatus for producing a plurality of continuous glass fibers having an electrically heated bushing with a plurality of tips, attenuation means for issuing the fibers from the tips of the bushing, collecting means for producing a collection of the fibers, a weighing means to weigh the collection of fibers, a computer means programmed to respond to applied signals from the weighing means and time of attenuation and to issue output signals, bushing temperature control means to control the heating of the bushing and to receive output signals from the programmed computer means in order to adjust the temperature of the bushing, and a circuit means to transmit the signals from the weighing means and time of attenuation monitoring means and from the program computer to the controller, the improvement comprising:
   A. The programmed computer means comprising:
      i. means to establish a data base of package weights and time of attenuation for each package weighed where the attenuation time is at a constant strand speed,
      ii. means to calculate throughputs of glass from the bushing from the weight of the collection and time of attenuation,
      iii. means for averaging the throughputs and adding throughputs to the data base,
      iv. means to compare the average throughputs to a standard set point throughput,
      v. a means to adjust the bushing temperature in response to a deviation of the average throughput from the standard throughput,
   B. circuit means to provide for transmission of signals from weighing and attenuation time monitoring to the programmed computer and to the bushing temperature controller and a power supply and to the bushing.

2. Apparatus of claim 1, wherein the weighing means weighs every completed package of glass fiber strands.

3. Article of claim 1, wherein the weighing means is positioned on a package handling device.

4. Apparatus of claim 1, wherein the monitoring means of the time of attenuation at constant strand speed is positioned on the spiral.

5. Article of claim 1, wherein the means to determining the average throughput is a running standard mean average.

6. Article of claim 1, wherein the means for averaging the throughputs is a running trimmed means averaging.

7. Apparatus of claim 1, which includes in the program computing means as a means for correcting the data in the established data base after an adjustment of bushing temperature by the main bushing temperature controller according to the formula:

$$\text{New Throughput} = \text{Old Throughput} (1 + \text{change in bushing temperature} \times \text{sensitivity of the bushing})$$

8. Apparatus of claim 1, which includes in the program computing means a means for ignoring previous established data in the data base when at least one of the following conditions occurs: two consecutive throughputs are greater than or less than 1 percent below the target throughput, any external bushing temperature adjustment is made.

9. Article of claim 1, wherein the bushing is a multi-segmented bushing and wherein the controller system includes at least one segment bushing controller for each segment of the bushing and the program computer means has a means for averaging the difference between throughputs for fibers issuing from different segments of the same bushing at the same time and a means for comparing the average to the value of zero, and a means for adjusting the bushing temperature through the segmented bushing controller to obtain an average value of zero.

10. Apparatus of claim 1, wherein the means for determining the throughput and the programmed computer means utilizes the formula:

$$\text{Throughput} = \frac{(1 - \%\text{ moisture}/100)(1 - \%\text{ LOI}/100)(\text{package weight} - \text{tube weight})}{\text{attenuation time at constant strand speed}}$$

11. Apparatus of claim 1, wherein a change in bushing temperature is equal to the throughput minus the average throughput divided by the throughput times the sensitivity.

12. Apparatus of claim 7, wherein the data collected previously to an adjustment in bushing temperature is corrected by the formula:

$$\text{New Throughput} = \text{Old Throughput} (1 + \text{change in bushing temperature} \times \text{sensitivity of the bushing})$$

13. Article of claim 9, wherein the program computer means includes a means for correcting data in the data base after an adjustment of bushing temperature is made according to the formula for a segment bushing controller that controls current:

$$\begin{pmatrix} \text{Throughput of package} \\ \text{from one segment} \end{pmatrix} =$$

old throughput from package of same segment in pounds/hour −

(the change in current/(bushing sensitivity for current change multiplied by $n$))

and the $$\begin{pmatrix} \text{New Throughput for} \\ \text{the other package} \end{pmatrix} =$$

old throughput for the other package in pounds per hour −

(the change in current/

(bushing sensitivity for current change multiplied by $n$))

wherein $n$ is a whole number equal to the number of segments in the bushing.

14. In a method of producing a plurality of continuous glass fibers involving: providing molten glass to a fiber forming device, withdrawing a plurality of molten glass streams from the fiber forming device, attenuating the streams and cooling them to solidify them into fine fibers by applying an attenuation force on the cooled fibers that is transmitted through the fibers to the streams, applying a chemical treating composition to protect the fibers from interfilament abrasion, gathering the fibers into one or more bundles of fibers, collecting the bundles as packages or mat, recording through a programmed computer at least the weight of the collection and the time of collecting the collection and adjusting the bushing temperature through at least one bushing temperature controller in response to the recorded data, the improvement comprising:
  A. establishing a database on the programmed computer of the weight of each completed package and the time of attenuation at constant strand speed,
  B. computing through the program computer the throughput of glass from the bushing for each package weight and attenuation time,
  C. computing the average of the throughputs by said program computer means,
  D. comparing the average values to standard values of throughput,
  E. adjusting automatically through circuit connection from the program computer means to the bushing temperature controller the temperature of the bushing to be closer to the set point temperature for the throughput.

15. In an apparatus for producing a plurality of continuous glass fibers having an electrically heated bushing with a plurality of tips, an attenuation means for issuing the fibers from the bushing, a collecting means to produce a collection of the fibers, a power control circuit for the fiber glass bushing including a power transformer having a secondary winding connected across the bushing, a power pack connected to the primary winding of the power transformer, a temerature controller responsive to the temperature of the bushing and connected to the power pack, and a bushing controller for controlling the relative temperatures of sections of the bushing, having a first and second controllable impedance device, connected in series across the bushing and across the secondary winding of the power transformer and having a current bypass means connected between the junction of said first and second controllable impedance devices and an intermediate tap on the bushing, the improvement comprising:
  A. a weighing means for weighing complete collections of the strands of glass fibers,
  B. monitoring means for attenuation times of strands produced from each section of the bushing at constant strand speeds,
  C. a programmed computer means electrically connected to receive output signals from the weighing means and the attenuation time monitoring means and having:
    1. a means to establish a database of the weights and times of attenuation,
    2. a means for calculating throughputs of the glass from each bushing section (and from the entire bushing) from the weight of the collections and the time of attenuation,
    3. a first averaging means for averaging the sum of throughputs for all segments of the bushing and placing the average throughputs and calculated throughputs in the database,
    4. a means for determining the difference in throughputs between collections of strands produced from different segments of the bushing at the same time and placing these difference values in the database,
    5. a second averaging means to average the differences in throughputs from step 4,
  D. a means for comparing the first average throughputs to a standard throughput value,
  E. a means for determining if the average of the difference in throughput values is other than zero,
  F. a means for adjusting the main temperature controller when the average throughput value deviates from the set point throughput value,
  G. means for adjusting the segment bushing controller when the average value of the difference in throughput is other than zero,
  H. circuit means for adjusting the temperature of the bushing from the segment controller and the main temperature controller when initiated by the programmed computer.

16. Apparatus of claim 15, wherein the first and second means for averaging involve a running trimmed means averaging.

17. Apparatus of claim 15, which includes the program computer means having a means for redetermining throughput values previously determined prior to an adjustment after an adjustment has been made.

18. Apparatus of claim 17, wherein the means for redetermining the throughput values involves the formula New throughput value=old throughput value
[1+(change in temperature of the bushing×the sensitivity factor)]

and for redetermining the difference in throughputs by the formula:

$$\begin{pmatrix} \text{New throughput for} \\ \text{package } A \end{pmatrix} = \text{old throughput for package } A -$$

(change in bushing temperature divided by 8.55 × 2)

-continued $$\left\{\begin{array}{c}\text{New throughput for}\\\text{second package}\end{array}\right\} + \text{old throughput for second package} +$$

(change in bushing temperature divided by (8.55 × 2)).

19. Apparatus of claim 15, wherein the throughput is calculated by the formula:

$$\text{throughput} = \frac{(1 - \% \text{ moisture}/100)(1 - \% \text{ } LOI/100)}{\text{attenuation time}}$$

20. Apparatus of claim 15, wherein a comparison of the average throughput value to a set point throughput value is performed with the calculation Change in bushing temperature is proportional to throughput of set point in pounds/hour − average throughput in pounds/hour divided by set point throughput in pounds/hour times the sensitivity factor of the bushing.

21. Apparatus of claim 15, wherein the program computer means includes a means for determining an upset condition from the factors of a more than 2 percent change in the difference of throughputs from collections of strand produced at the same time on different bushing segments, more than two consecutive throughput values greater than 2 percent of the set point or previously determined average throughput value and any manual external adjustment of the bushing temperature, and having a means for ignoring previously established throughput data and restarting the determination of throughput data after the upset condition.

* * * * *